US012650144B2

(12) United States Patent
Hsu et al.

(10) Patent No.: US 12,650,144 B2
(45) Date of Patent: Jun. 9, 2026

(54) HINGE STRUCTURE AND TERMINAL DEVICE

(71) Applicant: Chiun Mai Communication Systems, Inc., New Taipei (TW)

(72) Inventors: Wei-Hua Hsu, New Taipei (TW); Chia-Hsin Chang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 329 days.

(21) Appl. No.: 18/240,348

(22) Filed: Aug. 30, 2023

(65) Prior Publication Data
US 2024/0084845 A1     Mar. 14, 2024

(30) Foreign Application Priority Data
Sep. 9, 2022    (CN) .......................... 202211104836.7

(51) Int. Cl.
| *F16C 11/04* | (2006.01) |
| *G06F 1/16* | (2006.01) |
| *E05D 3/12* | (2006.01) |
| *E05D 11/10* | (2006.01) |

(52) U.S. Cl.
CPC ............ *F16C 11/04* (2013.01); *G06F 1/1681* (2013.01); *E05D 3/122* (2013.01); *E05D 11/105* (2013.01)

(58) Field of Classification Search
CPC ......... F16C 11/04; F16C 11/045; F16C 11/12; G06F 1/1681; G06F 1/1616; G06F 1/1618; G06F 1/162; E05D 3/122; E05D 11/105
USPC ........................................................ 16/342
See application file for complete search history.

(56) References Cited

U.S. PATENT DOCUMENTS

| 7,076,836 B1 * | 7/2006 | Butka ................. E05D 11/1057 16/334 |
| 8,074,322 B2 * | 12/2011 | Wang .................... G06F 1/1616 16/342 |
| 8,245,356 B2 * | 8/2012 | Chu ...................... G06F 1/1681 16/342 |
| 8,256,065 B2 * | 9/2012 | Ikunami ................. H04N 5/64 16/342 |
| 8,631,542 B2 * | 1/2014 | Chen ..................... E05D 11/082 16/337 |
| 8,914,946 B2 * | 12/2014 | Hsu ........................ G06F 1/1681 16/342 |

(Continued)

FOREIGN PATENT DOCUMENTS

| CN | 212509195 U | 2/2021 |

*Primary Examiner* — Jeffrey O'Brien
(74) *Attorney, Agent, or Firm* — ScienBiziP, P.C.

(57) ABSTRACT

A hinge structure includes two hinge arms, two shaft gears, at least one first elastic piece, and at least one second elastic piece. Each hinge arm includes a central shaft. Each of the two shaft gears is connected to the central shaft, each shaft gear includes an extending portion, the groove is defined on the extending portion. Each first elastic piece includes two elastic arms, a first connecting portion, and two protrusions. The elastic arms are disposed on opposite sides of the first connecting portion, the elastic arms and the first connecting portion cooperatively form a first opening, the extending portion passes through the first opening, each protrusion is disposed on each elastic arm. Each second elastic piece is sleeved on the extending portion. The protrusions are configured to be accommodated in the groove. A terminal device is provided according to the present disclosure.

18 Claims, 24 Drawing Sheets

(56)     References Cited

U.S. PATENT DOCUMENTS

| | | | | |
|---|---|---|---|---|
| 8,959,716 B2 * | 2/2015 | Hsu | ........................... | E05D 3/06 |
| | | | | 16/302 |
| 9,547,342 B2 * | 1/2017 | Horng | ................... | G06F 1/1681 |
| 11,359,425 B2 * | 6/2022 | Chang | ....................... | E05D 3/18 |
| 11,761,476 B2 * | 9/2023 | Lin | ....................... | G06F 1/1681 |
| | | | | 16/233 |
| 2006/0272128 A1 * | 12/2006 | Rude | .................... | E05D 11/084 |
| | | | | 16/342 |
| 2015/0160695 A1 * | 6/2015 | Su | ........................... | E05D 3/12 |
| | | | | 16/366 |
| 2015/0362958 A1 | 12/2015 | Shang | | |
| 2019/0146559 A1 * | 5/2019 | Chiang | ................ | G06F 1/1681 |
| | | | | 361/809 |
| 2024/0022654 A1 * | 1/2024 | Sung | ....................... | F16C 11/04 |
| 2024/0089356 A1 * | 3/2024 | Hsu | ....................... | G06F 1/1656 |
| 2025/0390149 A1 * | 12/2025 | Lee | ....................... | G06F 1/1681 |

* cited by examiner

100

20c

HINGE STRUCTURE AND TERMINAL DEVICE

CROSS-REFERENCE TO RELATED APPLICATIONS

This present disclosure is based on and claims priority to China Patent Application No. 202211104836.7 filed on Sep. 9, 2022 in China National Intellectual Property Administration, the contents of which are incorporated by reference herein.

FIELD

The subject matter herein generally relates to mechanical technologies, in particular to a hinge structure and a terminal device having the hinge structure.

BACKGROUND

A hinge structure with self-locking function and hovering function is used in a terminal device. However, various components may be needed to realize the self-locking and hovering functions, which may result in an increase of the size of the hinge structure, causing the cost of the hinge structure to be increased and the structure of the assembly process to be complicated. Therefore, there is a room for improvement in the art.

BRIEF DESCRIPTION OF THE DRAWINGS

Implementations of the present technology will now be described, by way of example only, with reference to the attached figures.

DETAILED DESCRIPTION

Figure 1:
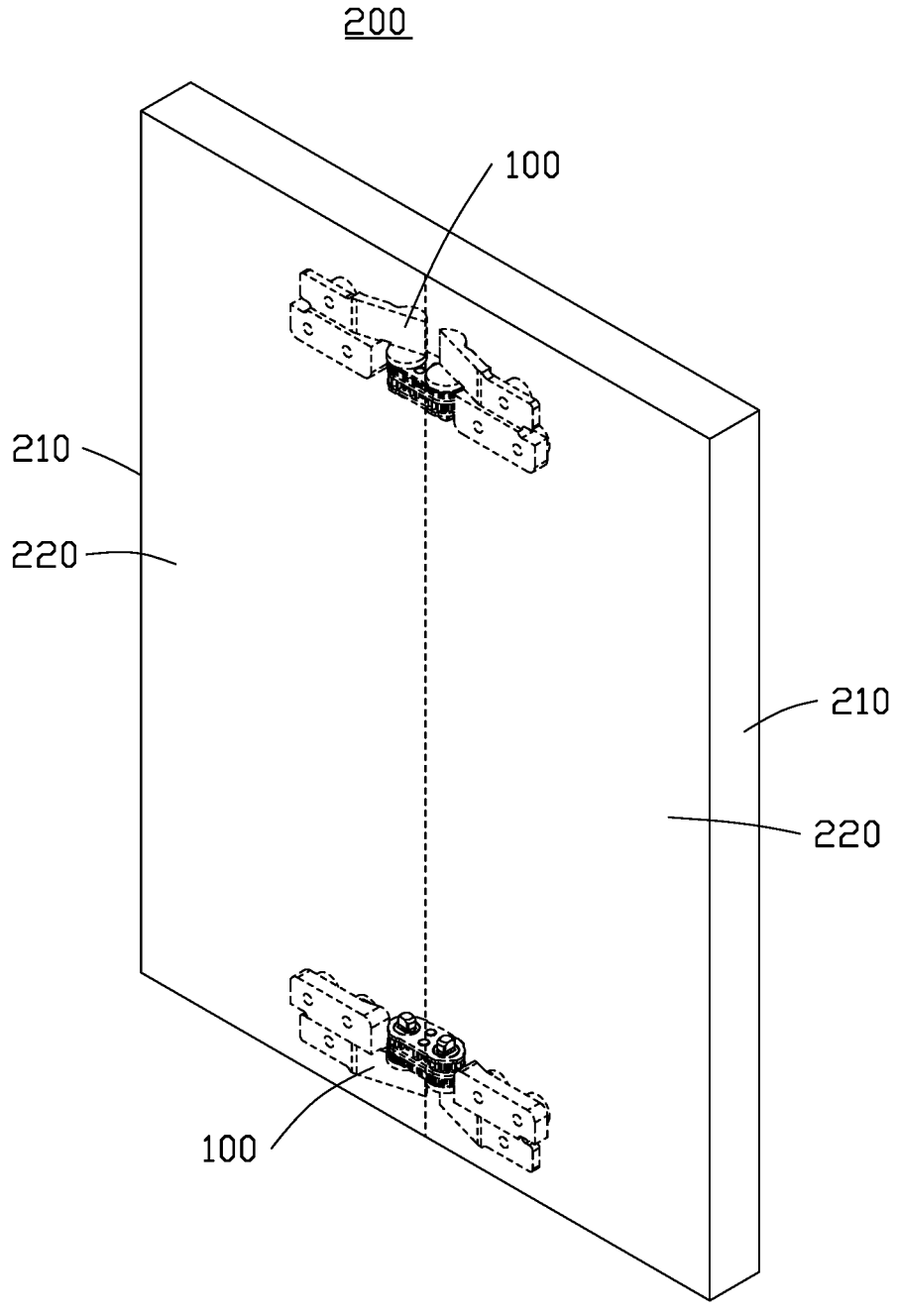
FIG. 1 is a diagrammatic view of an embodiment of a terminal device according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Some embodiments of the present disclosure will be described in detail with reference to the drawings. If no conflict, the following embodiments and features in the embodiments can be combined with each other.

Referring to FIG. 1, a terminal device 200 is provided according to an embodiment of the present disclosure. The terminal device 200 is a product to which a hinge structure 100 can be applied. The terminal device 200 may be an electronic product, including but not limited to a foldable mobile phone, a foldable tablet, a foldable computer, a camera, a drone, a desk lamp, and the like. The terminal device 200 may also be a non-electronic product, including but not limited to a Bluetooth earphone box, a glasses box, and the like. In the embodiment, the terminal device 200 is a foldable mobile phone. The foldable mobile phone includes a screen 220 and two bodies 210. The screen 220 is connected to the two bodies 210, and the hinge structure 100 is connected with the two bodies 210. An included angle between the two bodies 210 may be adjusted through the hinge structure 100. A user can change the included angle between the two bodies 210 according to actual needs. For example, when the user does not use the terminal device 200, the included angle between the two bodies 210 can be 0 degree, so that the terminal device 200 is in a close state, making the terminal device 200 more portable. When the user needs to watch the screen 220, the included angle between the two bodies 210 may be substantially 180 degrees, so that the terminal device 200 is in an open state.

In some embodiments, the screen 220 may be a foldable screen. That is, the screen 220 with a foldable function, which is used to display a user interface of an application. When the screen 220 further has a touch function, the screen 220 can also receive a touch operation thereon using any suitable object such as a finger or a touch pen. In some embodiments, the screen 220 is made of a flexible material (with certain stretchability) to realize the foldable function. The screen 220 may be a flexible Organic Light-Emitting Diode.

The structures of the two bodies 210 of the terminal device 200 are determined based on an actual application scenario of the hinge structure 100. For example, in the embodiment, both the two bodies 210 are where the screen is to be located.

Figure 2:
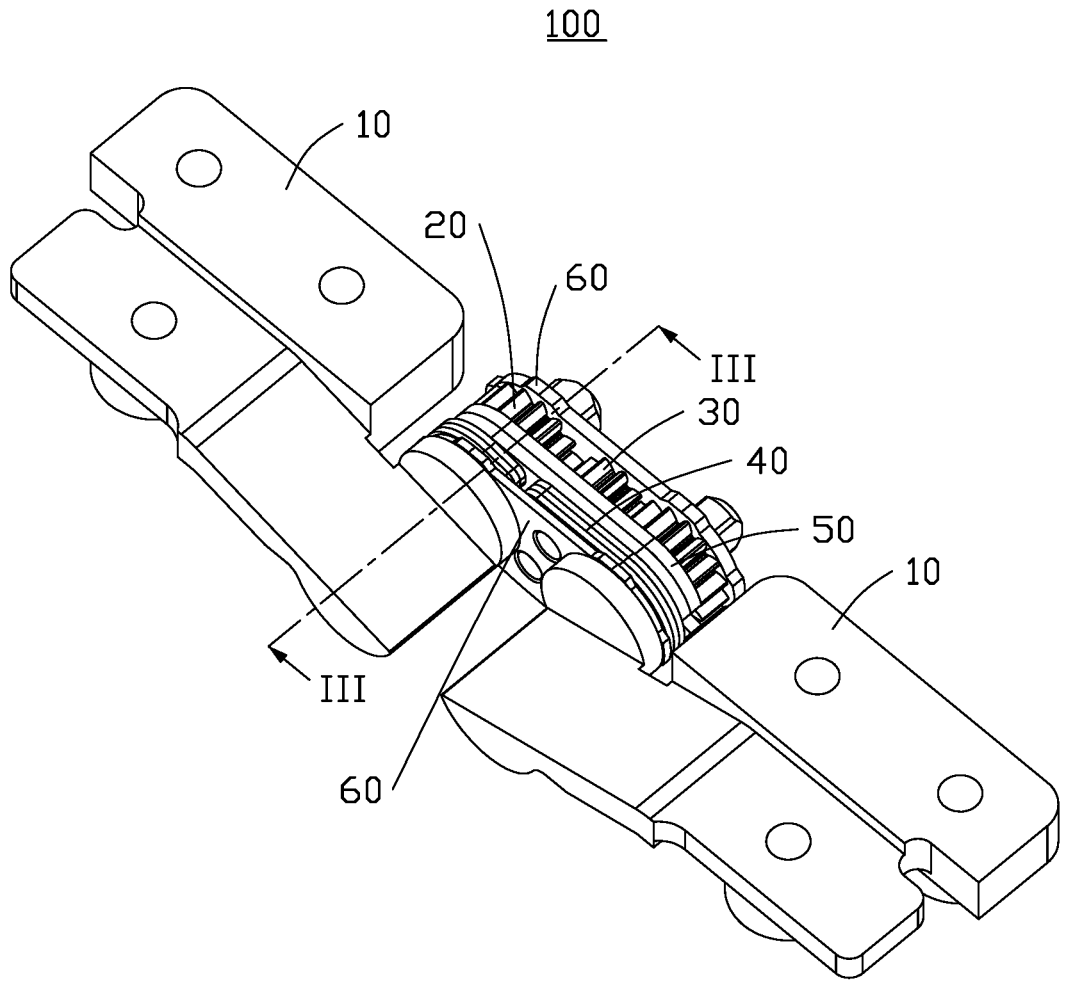
FIG. 2 is a diagrammatic view of an embodiment of a hinge structure according to the present disclosure.
Figure 3:
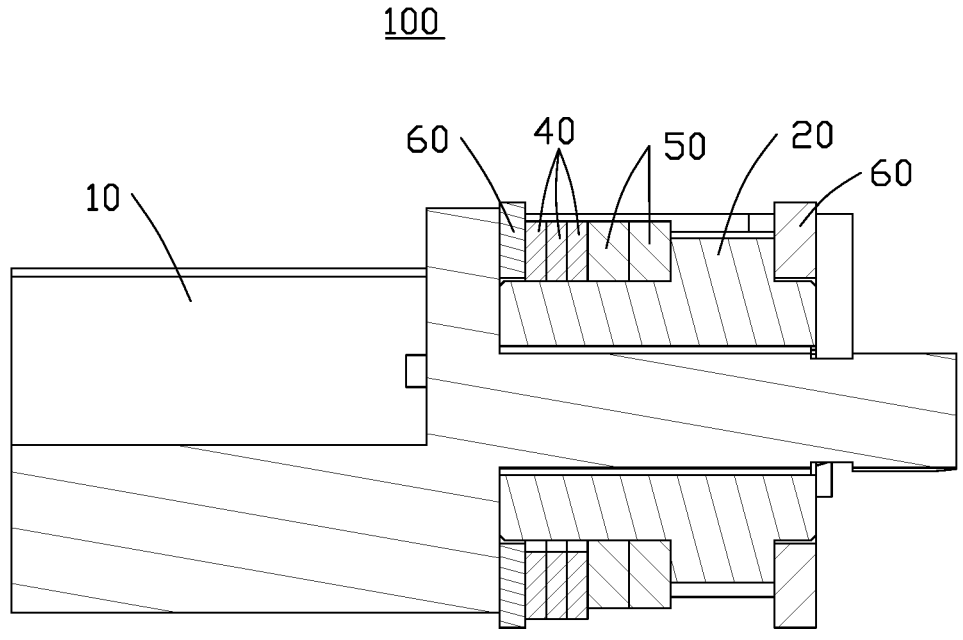
FIG. 3 is a cross-sectional view taken along line of FIG. 2.

Referring to FIGS. 2 and 3, FIG. 2 is a diagrammatic view of an overall structure of the hinge structure 100, and FIG. 3 is a cross-sectional view along the of FIG. 2. The hinge structure 100 includes two hinge arms 10, two shaft gears 20, two connecting gears 30, at least one first elastic piece 40, and at least one second elastic piece 50. The two hinge arms 10 are fixed to the two bodies 210, respectively. The two connecting gears 30 are disposed between and engaged with the two shaft gears 20. Each of the two hinge arms 10 is adjacent to one of the two shaft gears 20, one of the two connecting gears 30, one of the at least one first elastic piece 40, and one of the at least one second elastic piece 50. The hinge structure 100 may further include two fixing members 60. The two shaft gears 20, the two connecting gears 30, the at least one first elastic piece 40, and the at least one second elastic piece 50 are disposed between the two fixing members 60. In the embodiment, the at least one first elastic piece 40 is used to realize a self-locking function of the hinge structure 100, and can also provide a portion of a torques for the hinge structure 100. The at least one second elastic piece 50 provides a portion of a torques for the hinge structure 100, thereby realizing the self-locking and torques functions of the hinge structure 100.

Figure 4:
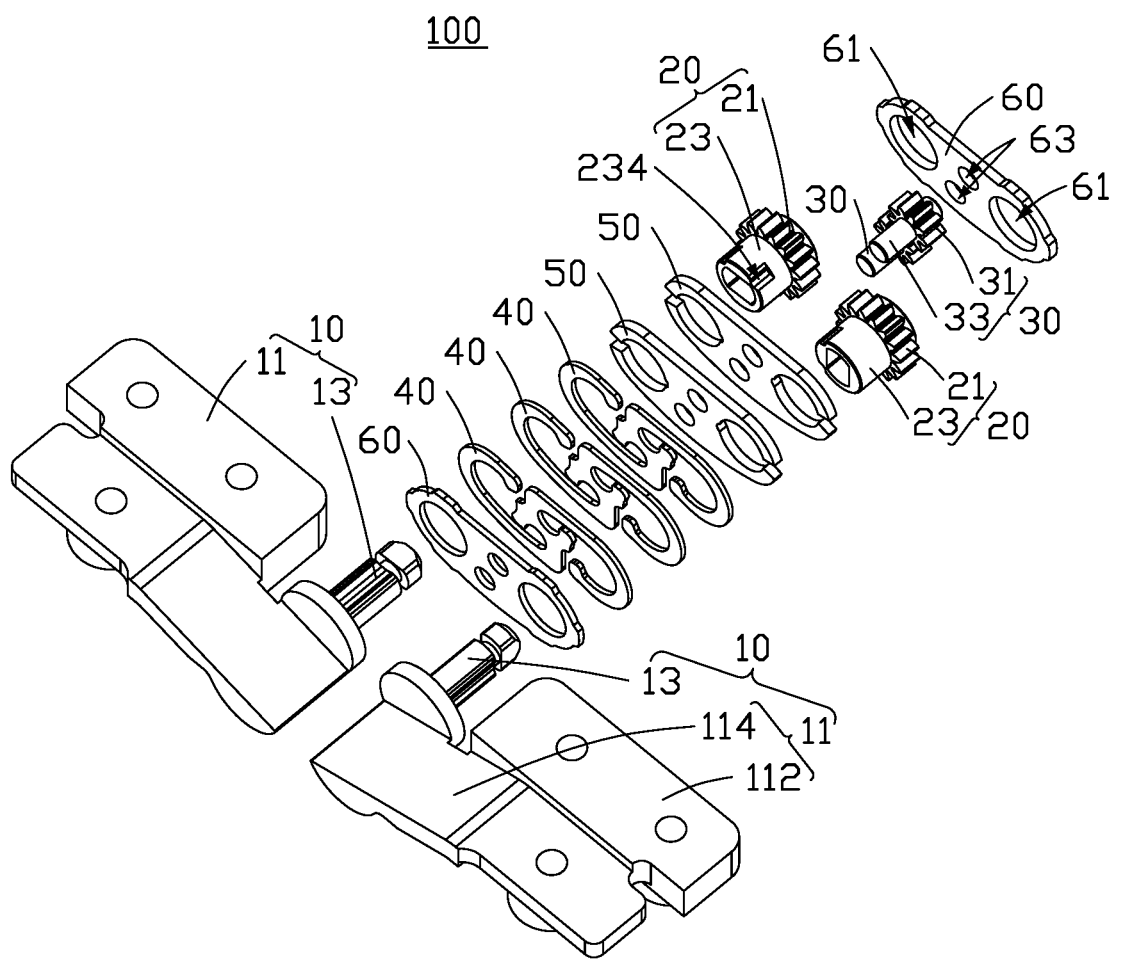
FIG. 4 is an exploded view of the hinge structure of FIG. 2.

Referring to FIG. 4, which is an exploded view of the hinge structure 100 shown in FIG. 2. Each of the two hinge arms 10 includes a fixing member 11 and a central shaft 13 fixed to each other. Each fixing member 11 is fixed to one of the two bodies 210. Each fixing member 11 includes a first fixing portion 112 and a second fixing portion 114. The second fixing portion 114 is parallel to and adjacent to the first fixing portion 112. The second fixing portion 114 protrudes from the first fixing portion 112. Each central shaft 13 extends from a surface of the second fixing portion 114 protruding from the first fixing portion 112 towards the first fixing portion 112. The extending directions of the two central shafts 13 are parallel to each other and located on a same side of the two fixing members 11. Each fixing member 11 is flat, which is convenient for the connection of the fixing member 11 and the two shaft gears 20, so that a movement of the two hinge arms 10 is consistent with a movement of the two shaft gears 20.

Figure 5:
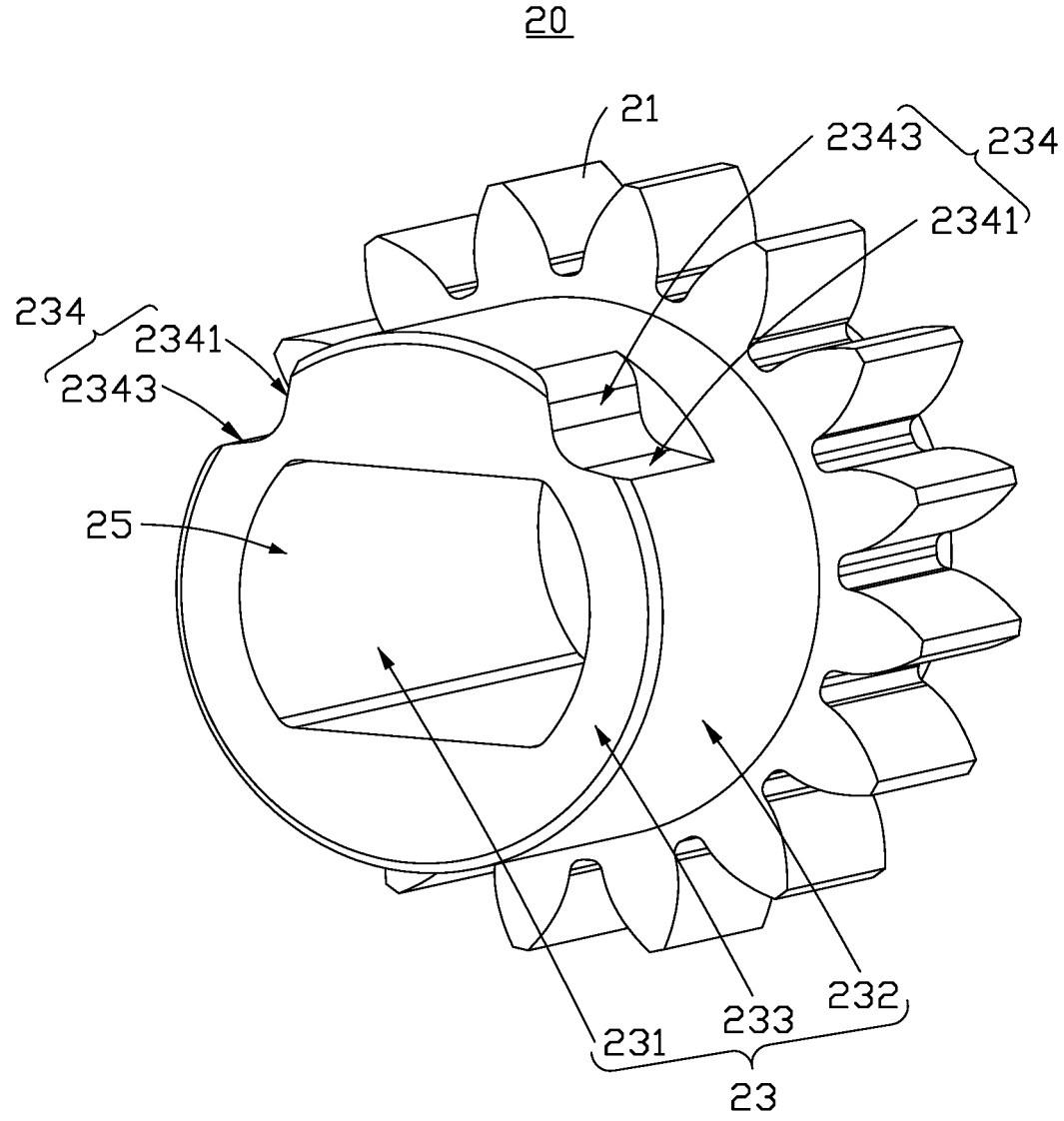
FIG. 5 is a diagrammatic view of a shaft gear in the hinge structure of FIG. 2.

Referring to FIG. 5, each of the two shaft gears 20 includes a first gear portion 21 and an extending portion 23 fixed to each other. The extending portion 23 extends from a surface of the first gear portion 21. A through hole 25 is defined on each of the two shaft gears 20. Each through hole 25 passes through the first gear portion 21 and the extending portion 23. The shape of each through hole 25 is flat to match the central shaft 13, so that the two shaft gears 20 are detachably fixed on the two hinge arms 10. As such, the two shaft gears 20 are driven to rotate synchronously when the two hinge arms 10 rotate. Each through hole 25 is engaged with the central shaft 13, so that the two shaft gears 20 are detachably fixed on the two hinge arms 10. As such, the two shaft gears 20 and the two hinge arms 10 can be rotated synchronously.

Each extending portion 23 includes an inner surface 231, an outer surface 232, and an end surface 233. The inner surface 231 surrounds a portion of each through hole 25. The outer surface 232 faces away from the inner surface 231 and is connected with the first gear portion 21. The end surface 233 is disposed on a side of the extending portion 23 away from the first gear portion 21, and connects to the inner surface 231 and the outer surface 232. At least one groove 234 is defined on each extending portion 23. Each of the at least one groove 234 is recessed from the outer surface 232 toward the inner surface 231. Each of the at least one groove 234 includes a first sidewall 2341 and a second sidewall 2343 connected to each other. The first sidewall 2341 and the second sidewall 2343 may be directly or indirectly connected to each other. In the embodiment, the first sidewall 2341 and the second sidewall 2343 are directly connected to each other. The first sidewall 2341 of each of the at least one groove 234 is adjacent to the second sidewall 2343 of another adjacent of the at least one groove 234, and both the first sidewall 2341 and the second sidewall 2343 are connected to the outer surface 232.

In some embodiments, the number of the at least one groove 234 may depend on the number of included angles between the two bodies 210 required for the self-locking function. When a plurality of grooves 234 are defined, the plurality of grooves 234 are spaced from each other. In the embodiment, two included angles are required for the self-locking function, two grooves 234 are defined on each extending portion 23. In other embodiments, the number of groove(s) 234 may also be one or more than two. The position of each of the at least one groove 234 depends on the included angle between the two bodies 210 when the two bodies 210 are self-locked. In the embodiment, when hinge structure 100 is self-locked, the included angle between the bodies 210 is 0 degree or 180 degrees. Therefore, the included angle between two adjacent grooves 234 on each extending portion 23 is 90 degrees. In other embodiments, the included angle between two adjacent grooves 234 can be changed according to actual needs.

Referring to FIGS. 2 and 4, the two connecting gears 30 are disposed between the two shaft gears 20. Each of the two connecting gears 30 includes a second gear portion 31 and two rod portions 33. The two rod portions 33 are disposed on two sides of the second gear portion 31. The two second gear portions 31 are engaged with the two first gear portions 21, so that the two shaft gears 20 can rotate in opposite directions, thereby driving the two hinge arms 10 to rotate in opposite directions. That is, when one of the two hinge arms 10 rotates clockwise, the other one of the two hinge arms 10 rotates counterclockwise.

Figure 6:
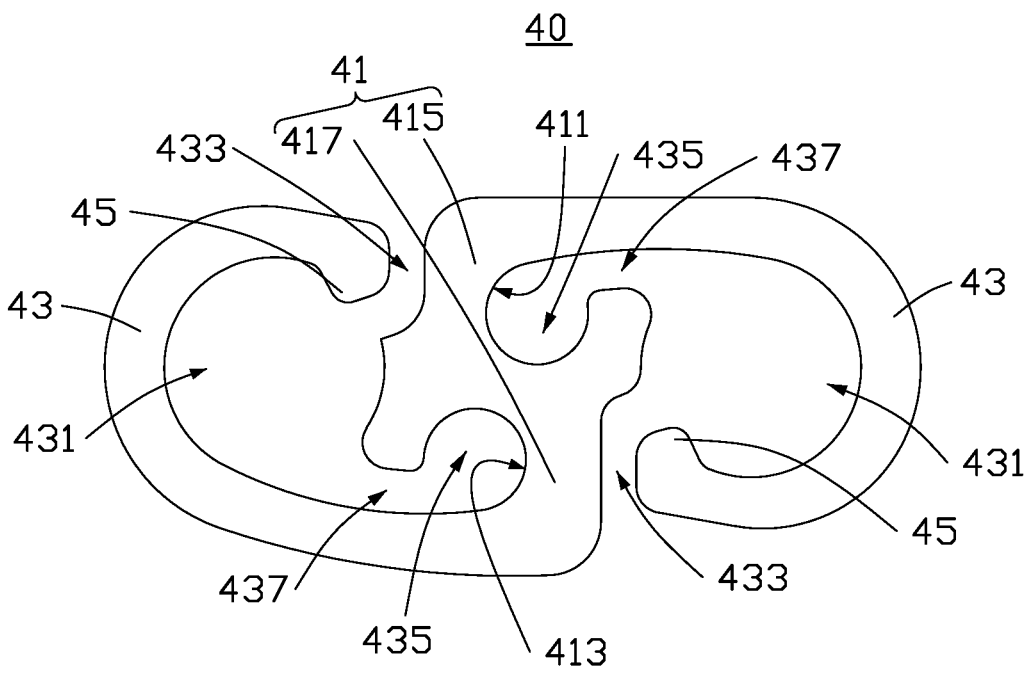
FIG. 6 is a diagrammatic view of a first elastic piece in the hinge structure of FIG. 2.

Referring to FIGS. 4 and 6, in the embodiment, the number of the at least one first elastic piece 40 is three. In other embodiments, the number of the at least one first elastic piece 40 is greater than or less than three according to actual requirements. Each of the three first elastic pieces 40 includes a first connecting portion 41, two elastic arms 43, and two protrusions 45. The two elastic arms 43 are disposed on opposite sides of the first connecting portion 41. One end of each of the two elastic arms 43 is connected to the first connecting portion 41, and the other end is spaced apart from the first connecting portion 41 to form a first notch 433. Each of the two elastic arms 43 surrounds the first connecting portion 41 to form a first opening 431. The extending portion 23 of each of the two shaft gears 20 passes through the first opening 431. The extending portion 23 of each of the two shaft gears 20 is in contact with the first connecting portion 41 of one of the three first elastic pieces 40. Each of the two protrusions 45 is disposed on the surface of the two elastic arms 43 facing the extending portion 23. In the embodiment, each of the two protrusion 45 is disposed on an end of one of the two elastic arms 43 adjacent to the first notch 433, which can increase the length of the two elastic arms 43. In other embodiments, the protrusion structure 45 is not limited to be disposed at the end of the two elastic arms 43. When the two hinge arms 10 rotate relative to each other, the three first elastic pieces 40 rotate about the two shaft gears 20 accordingly, the two elastic arms 43 are deformed, and the two protrusions 45 can be accommodated in the at least one groove 234 of one of the two shaft gears 20 to realize the self-locking function of the hinge structure 100.

In the embodiment, the three first elastic pieces 40 are adjacent to and sleeved on the end of the extending portion 23. Each of the at least one groove 234 is formed by recessing the end surface 233 and the outer surface 232 together. Each of the three first elastic pieces 40 is disposed at the end of the extending portion 23, and can reduce a length of each of the at least one groove 234 along the extending direction of the extending portion 23, so as to reduce the influence of the at least one groove 234 on the strength of the extending portion 23.

In the embodiment, the first connecting portion 41 includes a first surface 411 and a second surface 413 opposite to each other. The first connecting portion 41 includes a first area 415 and a second area 417 connected to each other. The first area 415 includes a portion of the first surface 411 and a portion of the second surface 413. The second area 417 includes the remaining portion of the first surface 411 and the remaining portion of the second surface 413. One of the two elastic arms 43 is bent from the first surface 411 of the first area 415 toward the second area 417, to form one first opening 431. The other one of the two elastic arms 43 is bent from the second surface 413 of the second area 417 toward the first area 415, to form another first opening 431. The bending directions of the two elastic arms 43 are consistent with each other, that is, the two elastic arms 43 are formed by simultaneously extending the surfaces of the first connecting portion 41 on opposite sides clockwise or counterclockwise. The two elastic arms 43 are centrally symmetrical with each other, and the two first notches 433 are disposed at different ends of the first connecting portion 41.

A plurality of second openings 435 are defined on the first connecting portion 41. In the embodiment, the number of the plurality of second openings 435 is two, and the two rod portions 33 of the two connecting gears 30 pass through the two corresponding second openings 435.

A plurality of second notches 437 are defined on the first connecting portion 41. The number of the plurality of second notches 437 is two. Each of the two second notches 437 is disposed between one of the two second openings 435 and the first opening 431, so that the first opening 431 connects to each of the two second openings 435, which can increase the length of each of the two elastic arms 43. The first connecting portion 41 is provided with two second notches 437, and the first connecting portion 41 is substantially I-shaped or H-shaped with a predetermined angle.

Figure 7:
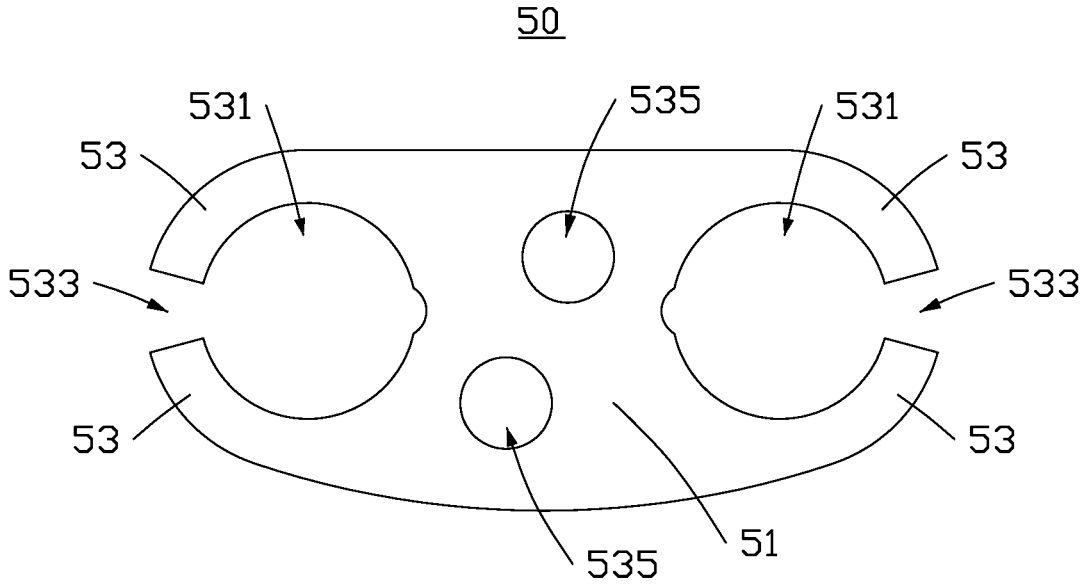
FIG. 7 is a diagrammatic view of a second elastic piece in the hinge structure of FIG. 2.

Referring to FIGS. 4 and 7, in the embodiment, the number of the at least one second elastic piece 50 is two. In other embodiments, the number of the at least one second elastic piece 50 is greater than or less than two according to actual requirements. The two second elastic pieces 50 are adjacent to and disposed between the three first elastic pieces 40 and the first gear portion 21. Each of the two second elastic pieces 50 includes a second connecting portion 51 and two engaging structures 53. The two engaging structures 53 are disposed on opposite sides of the second connecting portion 51. Each of the two engaging structures 53 and the second connecting portion 51 cooperative form a C-shaped third opening 531. The two engaging structures 53 disposed on the same side of the second connecting portion 51 are spaced apart to form a third notch 533. The extending portion 23 of each of the two shaft gears 20 passes through the third opening 531. The third notch 533 enables the two second elastic pieces 50 to be in interference fit with the extending portion 23. That is, when each of the two second elastic pieces 50 is not sleeved on the extending portion 23, the diameter of the third opening 531 is smaller than the shaft diameter of the extending portion 23. The two second elastic pieces 50 rotate about the two shaft gears 20, and a damping force is generated between the two second elastic pieces 50 and the extending portion 23, while the two hinge arms 10 rotate or are intended to rotate relative to each other to maintain the position of the two hinge arms 10. Thereby, a torques is provided for the hinge structure 100, so that the hinge structure 100 realizes the hovering function.

Two fourth openings 535 are defined on the second connecting portion 51. The two connecting gears 30 pass through the corresponding fourth openings 535.

In the embodiment, the three first elastic pieces 40 and the two second elastic pieces 50 are made of a same material. In other embodiments, the three first elastic pieces 40 and the two second elastic pieces 50 may also be made of different materials. During the relative rotation of the two hinge arms 10, when each of the two protrusions 45 is accommodated in one of the at least one groove 234, the diameter of the each of the two elastic arms 43 is relatively short. When the two protrusions 45 is not accommodated in one of the at least one groove 234, the diameter of the each of the two elastic arms 43 is relatively long, and each of the two elastic arms 43 needs to be deformed. That is, each of the three first elastic pieces 40 has certain elasticity and can rebound from deformation. A damping force is generated between the two second elastic pieces 50 and the extending portion 23, while the two hinge arms 10 rotate or are intended to rotate relative to each other, a torques is further provided for the hinge structure 100. Each of the two second elastic pieces 50 has certain plasticity.

Referring to FIG. 4, the two fixing members 60 are disposed on two sides of the first gear portion 21. The two shaft gears 20, the three first elastic pieces 40, the two second elastic pieces 50, and the two connecting gears 30 are disposed between the two fixing members 11. Each of the two rod portions 33 of the two connecting gears 30 passes through two fixing members 60, and the two fixing members 60 assemble the two hinge arms 10, the two shaft gears 20, the two connecting gears 30, the three first elastic pieces 40, and the two second elastic pieces 50 as a movable whole. In some embodiments, the number of fixing member(s) 60 may also be one or more than two.

Two fifth openings 61 and two sixth openings 63 are defined on each of the two fixing members 60. The two sixth openings 63 are defined between the two fifth openings 61. One extending portion 23 of the two shaft gears 20 passes through one of the two fifth opening 61, and one of the two rod portions 33 of the two connecting gears 30 passes through one of the two sixth opening 63. Thus, the two hinge arms 10, the two shaft gears 20, the connecting gears 30, the three first elastic pieces 40, and the two second elastic pieces 50 are assembled as a movable whole.

Figure 8:
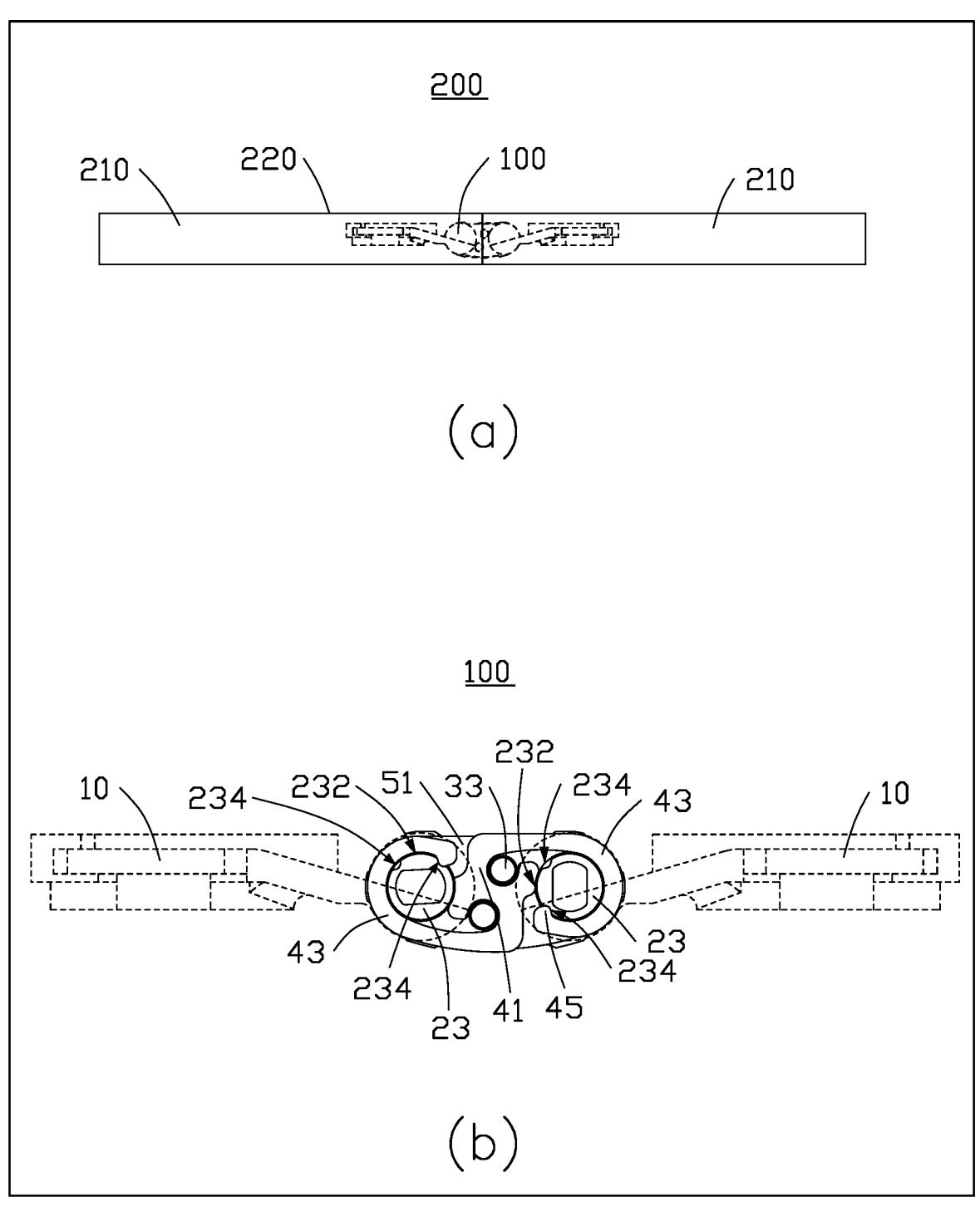
FIG. 8 is similar to FIG. 2, but shows the hinge structure in an open state.
Figure 9:
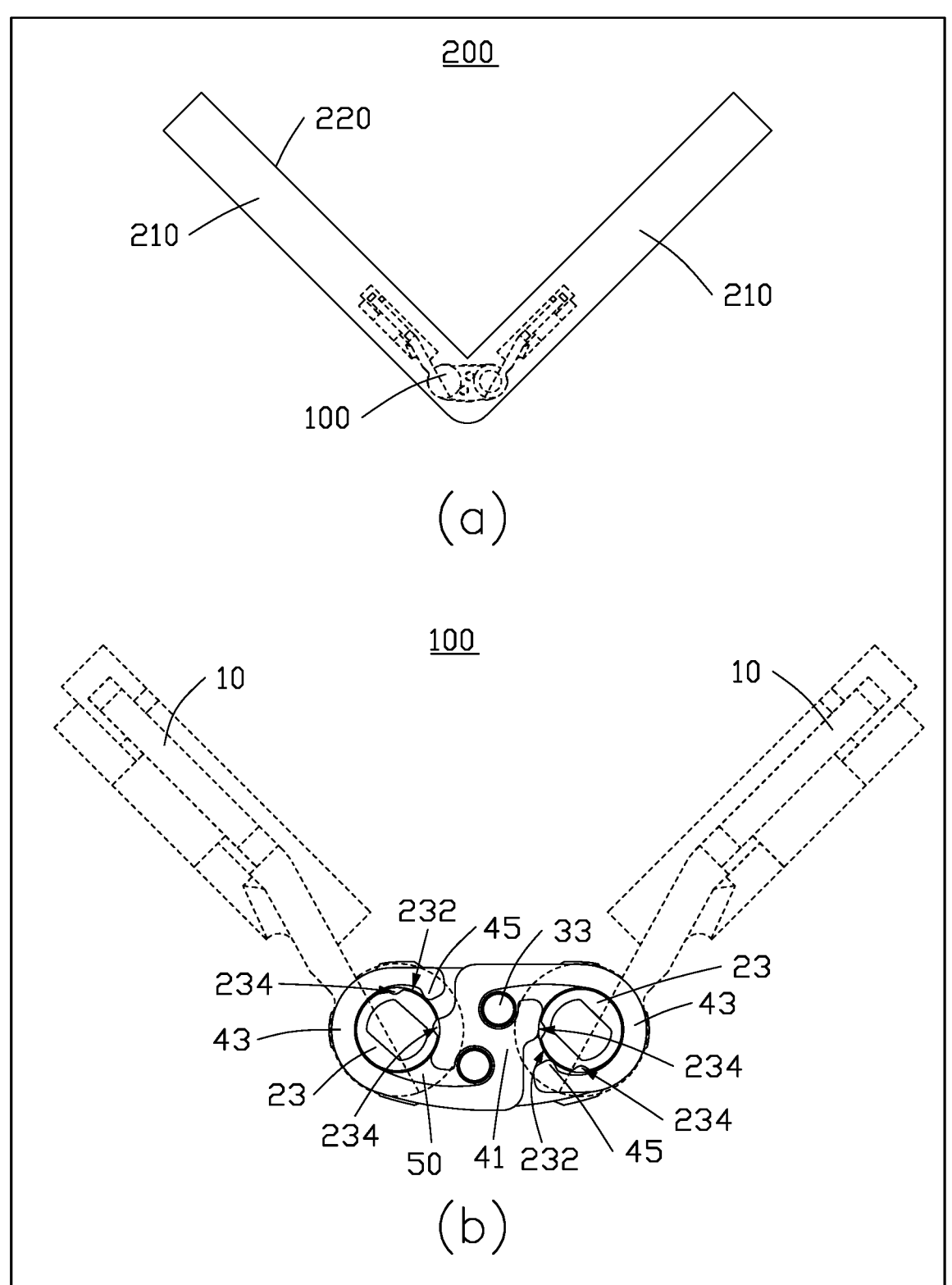
FIG. 9 is similar to FIG. 8, but shows the hinge structure in a hovering state.
Figure 10:
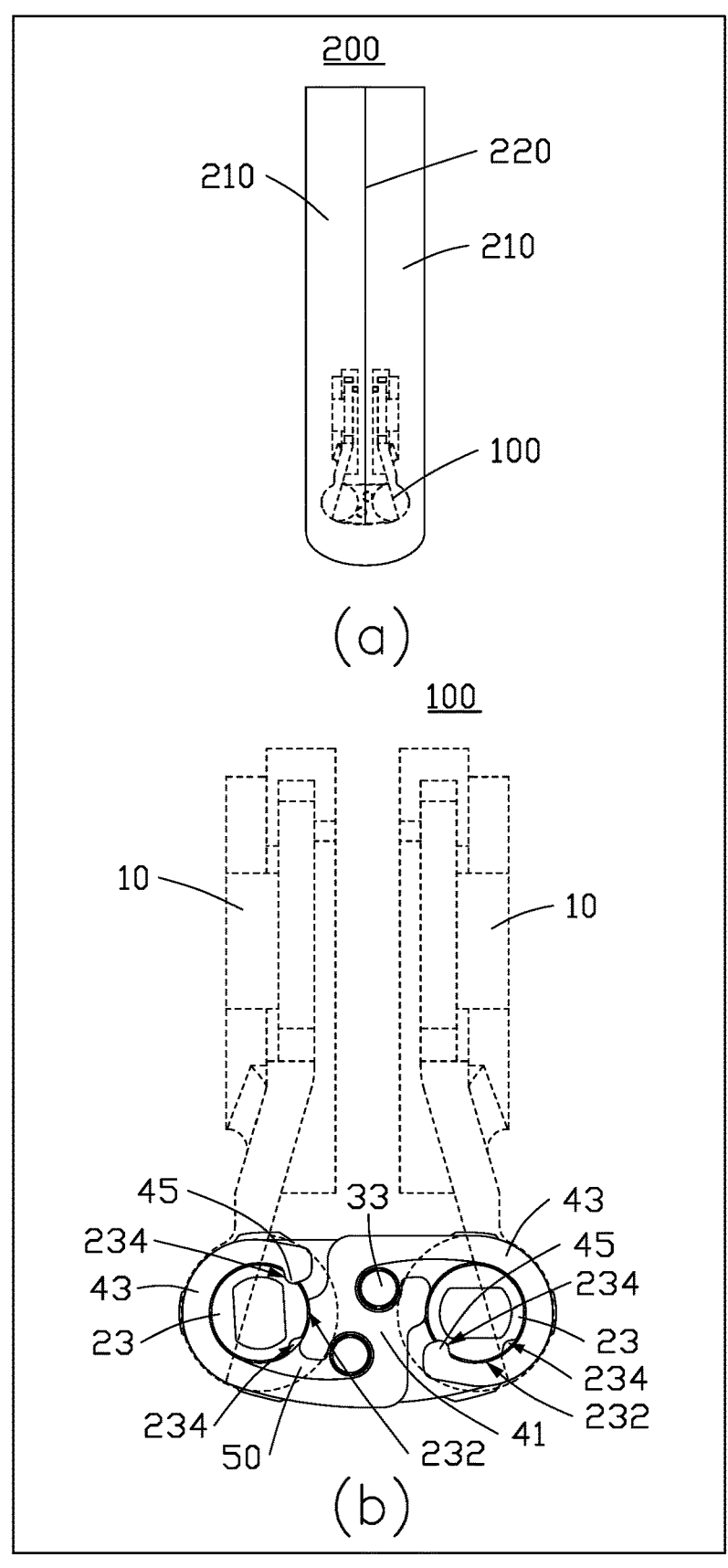
FIG. 10 is similar to FIG. 9, but shows the hinge structure in a close state.
Figure 11:
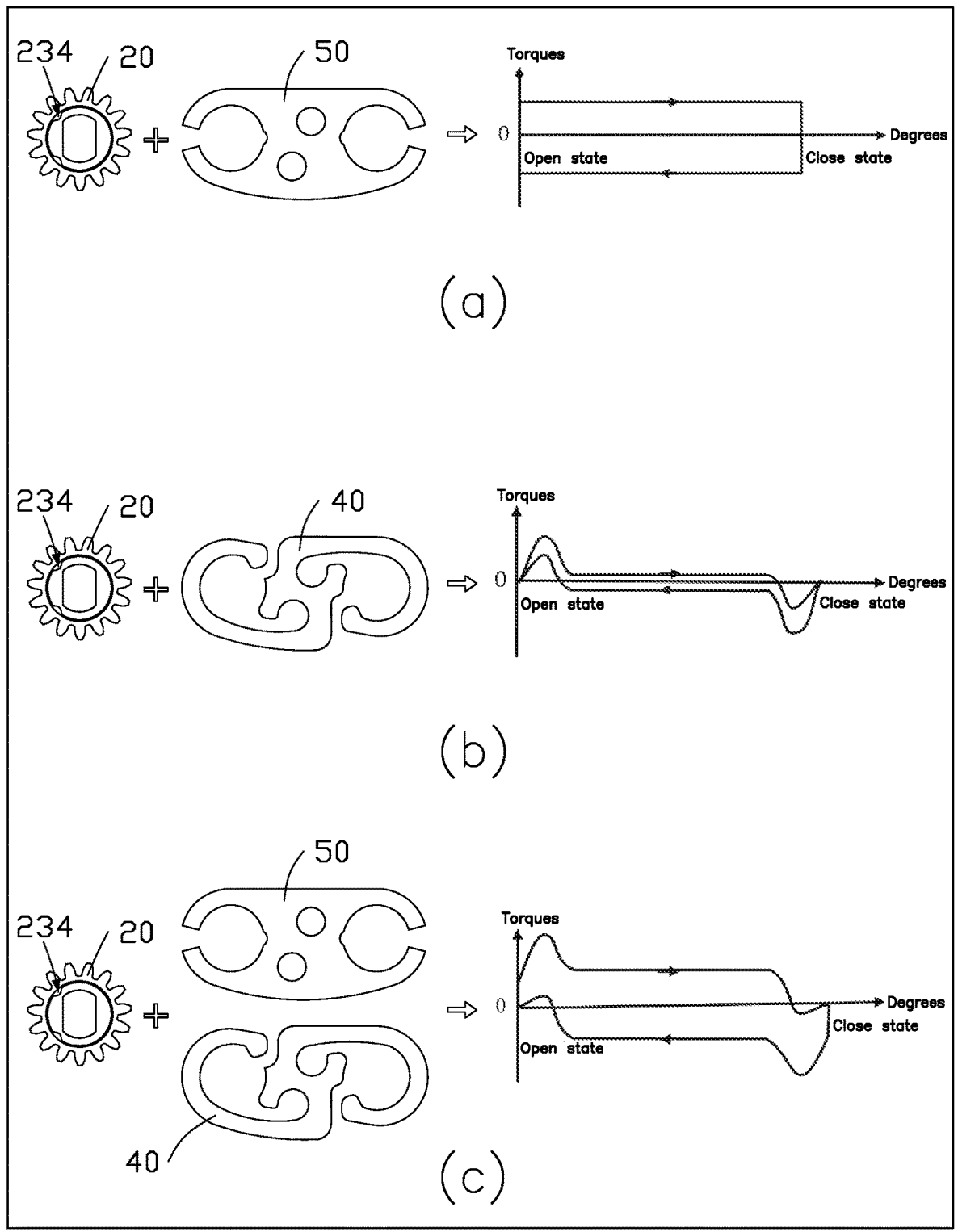
FIG. 11 includes a schematic diagram of a relationship of torques and included angles between the shaft gear in FIG. 5 and the second elastic piece in FIG. 7 are combined, a schematic diagram of a relationship of torques and included angles between the shaft gear in FIG. 5 and the first elastic piece in FIG. 6 are combined, and a schematic diagram of a relationship of torques and included angles among the shaft gear in FIG. 5, the first elastic piece in FIG. 6, and the second elastic piece in FIG. 7 are combined.

Referring to FIGS. 8 to 11, in order to illustrate how the hinge structure 100 of the terminal device 200 realizes the self-locking function and hovering function, the closing process of the hinge structure 100 will be described in detail as follows. FIG. 8(a), FIG. 9 (a), and FIG. 10 (a) are diagrammatic views showing the terminal device 200 switched from an open state to a close state. FIG. 8(b), FIG. 9 (b), and FIG. 10 (b) are diagrammatic views showing the hinge structure 100 of the terminal device 200 switched from an open state to a close state. The upper curve in FIG. 11 shows the change of torques of the hinge structure 100 switched from an open state to a close state. The lower curve in FIG. 11 shows the change of torques of the hinge structure 100 switched from a close state to an open state.

Referring to FIG. 8, when the terminal device 200 is in an open state, the two bodies 210 are on a same plane. That is, the included angle between the two body 210 is 180 degrees, the two protrusions 45 are accommodated in one of the grooves 234, and the two protrusions 45 is in contact with the first sidewall 2341 and the second sidewall 2343.

Referring to FIG. 9, an external force is applied on the two bodies 210 to close the two bodies 210. The two hinge arms 10 of the two bodies 210 are synchronously closed, which drives the two shaft gears 20 mounted thereto to synchronously rotate. Under the engaging function of the two connecting gears 30, the rotation directions of the two shaft gears 20 are opposite to each other. During the relative rotation process of the two shaft gears 20, the two shaft gears 20 are rotated relative to the three first elastic pieces 40 and the two second elastic pieces 50 on the extending portion 23, and the two protrusions 45 are moved relative to the at least one groove 234. The two protrusions 45 gradually move out of the at least one groove 234 along the first sidewall 2341, and a friction resistance is generated between one of the two protrusions 45 and the first sidewall 2341. One end of the first connection 41 is used as a fulcrum, and the two elastic arms 43 generates a compression until the two protrusions 45 are in contact with the outer surface 232 of the extending portion 23, a stable friction resistance is maintained between the two second elastic pieces 50 and the extending portion 23. During the process, the external force needs to overcome the resistance during the two protrusions 45 moving from the grooves 234 and the friction resistance between one of the two second elastic pieces 50 and the extending portion 23. The resistance during the two protrusions 45 moving from the at least one groove 234 gradually increases until the two protrusions 45 are in contact with the outer surface 232. When the two protrusions 45 contact the outer surface 232 of the extending portion 23, the external force overcomes the friction resistance between one of the two second elastic pieces 50 and the extending portion 23 and the friction resistance between one of the two protrusions 45 and the outer surface 232. That is, the frictional resistance between one of the two second elastic pieces and the extending portion 23 and the friction resistance between one of the two protrusions 45 and the outer surface 232 cooperatively provide a torque. In the process, the two bodies 210 remains a hovering state.

Referring to FIG. 10, the external force is applied to the two bodies 210 again, the two protrusions 45 enter another of the at least one groove 234 along the second sidewall 2343 of another of the at least one groove 234. Because the two elastic arms 43 rebound, the external force can be reduced. At the time, the included angle between the two bodies 210 is 0 degree.

Referring to FIG. 11, FIG. 11(a) is a schematic diagram of a relationship of torques and included angles between one of the two shaft gears 20 and one of the two second elastic pieces 50 are combined, FIG. 11(b) is a schematic diagram of a relationship of torques and included angles between one of the two shaft gears 20 and one of the three first elastic pieces 40 are combined, and FIG. 11(c) is a schematic diagram of a relationship of torques and included angles among one of the two shaft gears 20, one of the three first elastic pieces 40, and one of the two second elastic pieces 50 are combined. Each of the two shaft gears 20 is combined with the two second elastic pieces 50. In the process of closing or opening of the two bodies 210, the torque is constant that equals to the friction between one of the two second elastic pieces 50 and the extending portion 23. Each of the two shaft gears 20 is combined with the three first elastic pieces 40, when the two protrusions 45 move out of the at least one groove 234, the two protrusions 45 are blocked by the second sidewall 2343 of the groove 234 to increase the torque. When the two protrusions 45 move out of the at least one groove 234, the frictional resistance generated after the two protrusions 45 contact the outer surface 232 provides a portion of the torques. When the protrusions 45 enter the at least one groove 234, the deformation of the two elastic arms 43 are reduced, and the torques between the two elastic arms 43 and the extending portion 23 is reduced, so that the torques is reduced. The torque after the combination of the two shaft gears 20, the three first elastic pieces 40, and the two second elastic pieces 50 is the sum of the combination of the two shaft gears 20 and the two second elastic pieces 50 and the combination of the two shaft gears 20 and the three first elastic pieces 40.

Figure 12:
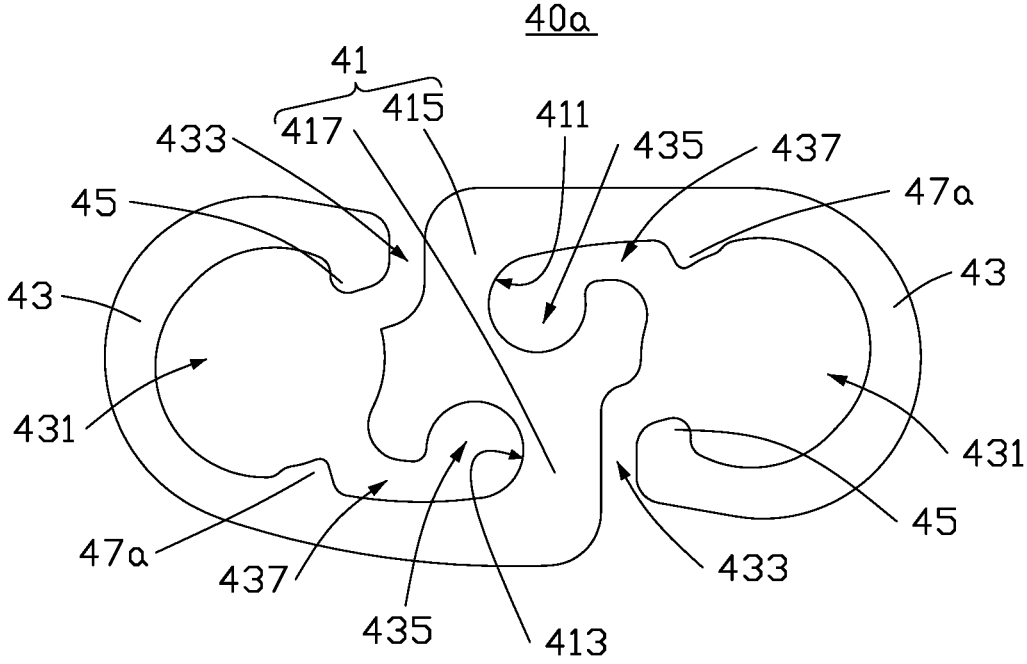
FIG. 12 is a diagrammatic view of yet another embodiment of a first elastic piece according to the present disclosure.

Referring to FIG. 12, a first elastic piece 40*a* is provided according to another embodiment of the present disclosure. The first elastic piece 40*a* further includes two protruding portions 47*a*. Each of the two protruding portions 47*a* is disposed on a surface of one of the two elastic arms 43 facing the extending portion 23. Each of the two protruding portions 47*a* is disposed between one of the two protrusions 45 and the first connecting portion 41, and each of the two protruding portions 47*a* is in contact with the extending portion 23. That is, the two protruding portions 47*a* and the first connecting portion 41 are in contact with the extending portion 23.

Figure 13:
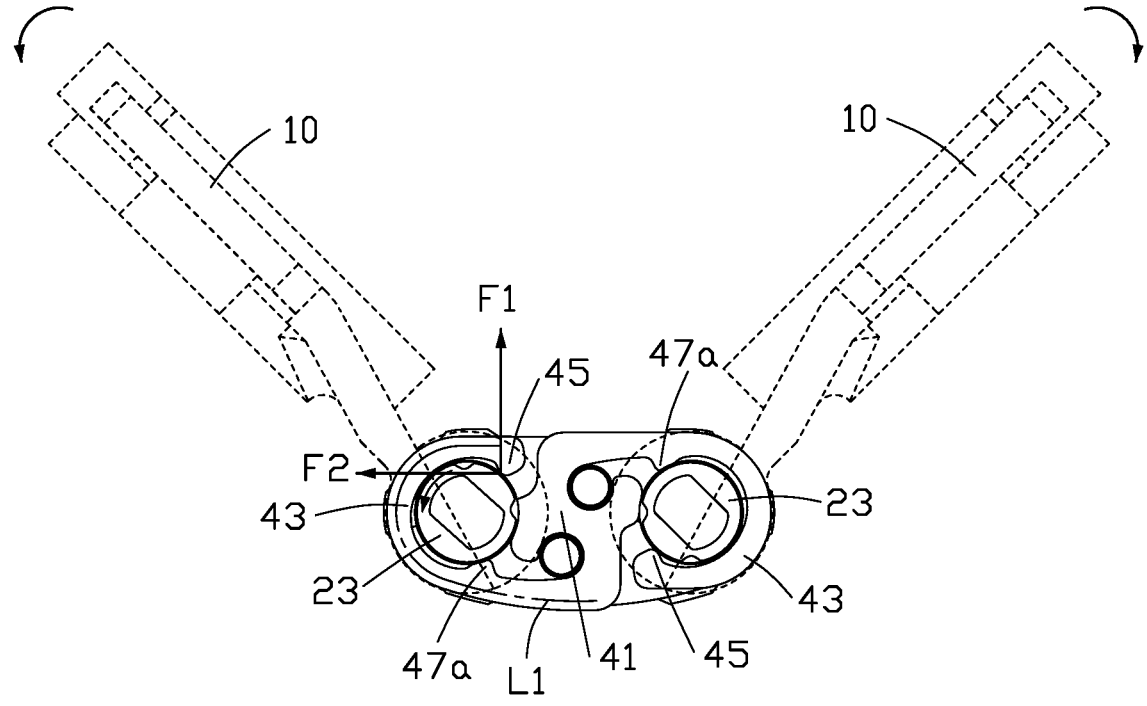
FIG. 13 is a diagrammatic view showing the direction of force during a rotation process after the first elastic piece in FIG. 12 is sleeved on the shaft gear.

Referring to FIG. 13, taking the relative movement between the extending portion 23 on the left side and the two elastic arms 43 as an example. When the extending portion 23 rotates counterclockwise, each of the two protrusions 45 receives an upward supporting force F1 and an opposite force F2, and the two elastic arms 43 are intended to be compressed toward the left side. Each of the two second openings 435 communicates with the first opening 431 through one of the two second notches 437, one end point of the first connecting portion 41 connected to the extending portion 23 is used as a fulcrum to increase the length of the elastic arm 43 (as shown in the dotted line length L1 in the two elastic arms 43 in FIG. 13), so that the two elastic arms 43 deforms when compressed.

Figure 14:
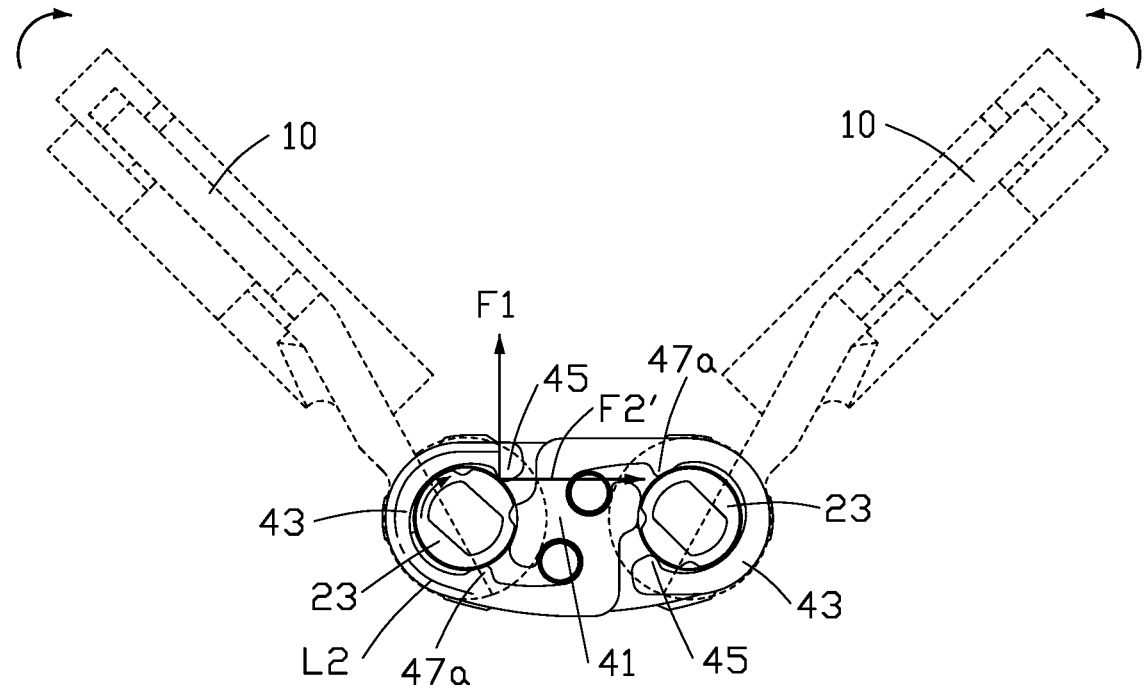
FIG. 14 is a diagrammatic view showing the direction of force during an opposite rotation process after the first elastic piece in FIG. 12 sleeved on the shaft gear.

Referring to FIG. 14, taking the relative movement between the extending portion 23 on the left side and the two elastic arms 43 as an example. When the extending portion 23 rotates clockwise, each of the two protrusions 45 receives an upward supporting force F1 and an opposite force F2', and the two elastic arms 43 are intended to be stretched toward the right side. Each of the two protruding portions 47*a* is in contact with the extending portion 23, each of the two protruding portions 47*a* connected to the extending portion 23 as a fulcrum, the length of the two elastic arms 43 is reduced (as shown by the dotted line length L2 in the two elastic arms 43 in FIG. 14), thereby fluctuation of the torques can be reduced.

In the embodiment, the two elastic arms 43 of the first elastic piece 40*a* are formed by winding clockwise. During the opening of the two hinge arms 10, the extending portion 23 on the left side rotates counterclockwise, and the extending portion 23 on the right side rotates clockwise. Therefore, the two elastic arms 43 corresponding to the extending portion 23 on the left side are intended to be compressed, and the two elastic arms 43 corresponding to the extending portion 23 on the right side are intended to be stretched. During the closing of the two hinge arms 10, the extending portion 23 on the left side rotates clockwise, and the extending portion 23 on the right side rotates counterclockwise. Therefore, the two elastic arms 43 corresponding to the extending portion 23 on the left side are intended to be stretched, and the two elastic arms 43 corresponding to the extending portion 23 on the right side are intended to be compressed. Therefore, the tendencies of the two elastic arms 43 during the process of opening or closing the two hinge arms 10 are inconsistent with each other.

Figure 15:
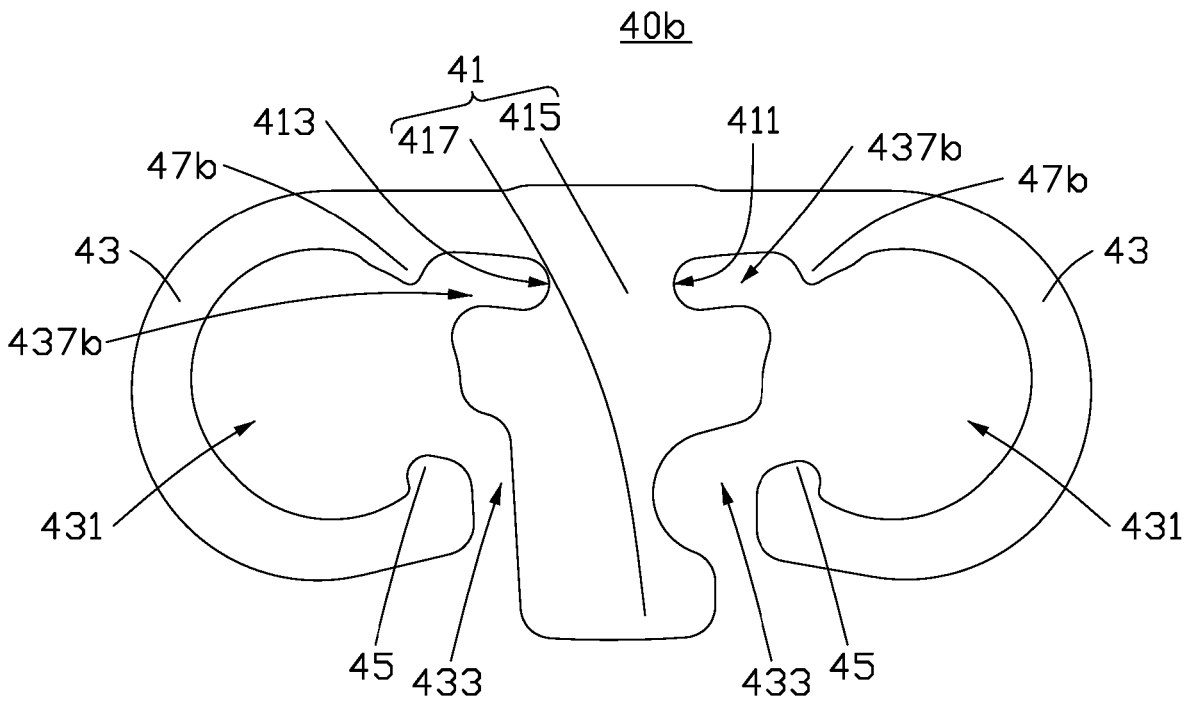
FIG. 15 is a diagrammatic view of yet another embodiment of a first elastic piece according to the present disclosure.

Referring to FIG. 15, a first elastic piece 40*b* is provided according to another embodiment of the present disclosure. The two elastic arms 43 are respectively bent and surrounded by the first surface 411 and the second surface 413 of the first area 415 towards the second area 417 to form two first openings 431. The bending directions of the two elastic arms 43 are inconsistent with each other. That is, the two elastic arms 43 are formed by extending from opposite sides of the first connecting portion 41 clockwise and counterclockwise. The two elastic arms 43 are disposed symmetrically on the left and right sides of the first connecting portion 41. The two first notches 433 are disposed at the same end of the first connecting portion 41, so that during the movement of the two elastic arms 43 relative to the extending portion 23, the direction of relative rotation between the two extending portions 23 and the corresponding two elastic arms 43 covered by the extending portion 23 is consistent, so that the deformation tendency of the two elastic arms 43 of the first elastic piece 40*b* is consistent. Combining the working principle of the first elastic piece 40*a* in the embodiment in FIGS. 13 and 14, it can be seen that when the first elastic piece 40*b* shown in FIG. 15 is applied to the hinge structure 100*b*, when the two hinge arms 10 are opened, the extending portion 23 on the left side rotates counterclockwise, and the extending portion 23 on the right side rotates clockwise. During the opening of the two hinge arms 10, the extending portion 23 on the left side rotates clockwise, and the extending portion 23 on the right side rotates counterclockwise. Therefore, the two elastic arms 43 corresponding to the extending portion 23 on the left side are intended to be compressed, and the two elastic arms 43 corresponding to the extending portion 23 on the right side are intended to be compressed. During the closing of the two hinge arms 10, the extending portion 23 on the left side rotates counterclockwise, and the extending portion 23 on the right side rotates clockwise. Therefore, the two elastic arms 43 corresponding to the extending portion 23 on the left side are intended to be stretched, and the two elastic arms 43 corresponding to the extending portion 23 on the right side are intended to be stretched. Therefore, the tendencies of the two elastic arms 43 during the process of opening or closing the two hinge arms 10 are consistent with each other. That is, the two elastic arms 43 tend to be stretched or compressed at the same time, so that the forces received by the two elastic arms 43 remain consistent. In the embodiment, the first connecting portion 41 is not a symmetrical structure, and can play a fool-proof role during the assembly of the hinge structure 100*b*. A second notch 437*b* for extending the two elastic arms 43 may be provided on the first elastic piece 40*b*.

In the embodiment, a protruding portion 47*b* can be disposed on the two elastic arms 43 of the first elastic piece 40*b*.

In the embodiment, each of the two second openings 435 on the first connecting portion 41 for the two connecting gears 30 to pass through may be omitted. The first elastic piece 40*b* is sleeved on the extending portion 23, and the first elastic piece 40*b* interacts with the extending portion 23 to realize the mutual connection between the first elastic piece 40*b* and the extending portion 23, so that the two second openings 435 can be omitted. Similarly, the two fourth openings 535 on each of the two second elastic pieces 50 for connecting the two connecting gears 30 to pass through can also be omitted.

Figure 16:
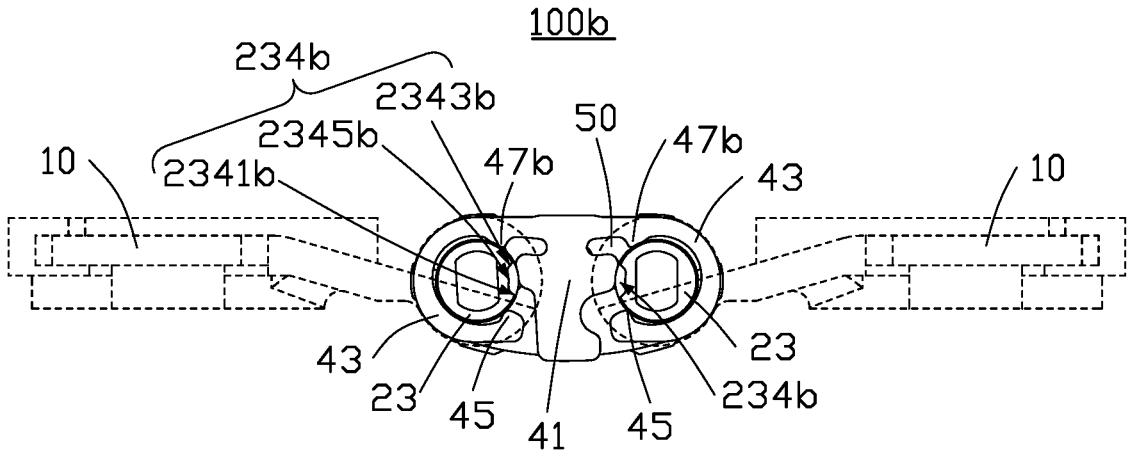
FIG. 16 is a diagrammatic view of yet another embodiment of a hinge structure in an open state.
Figure 17:
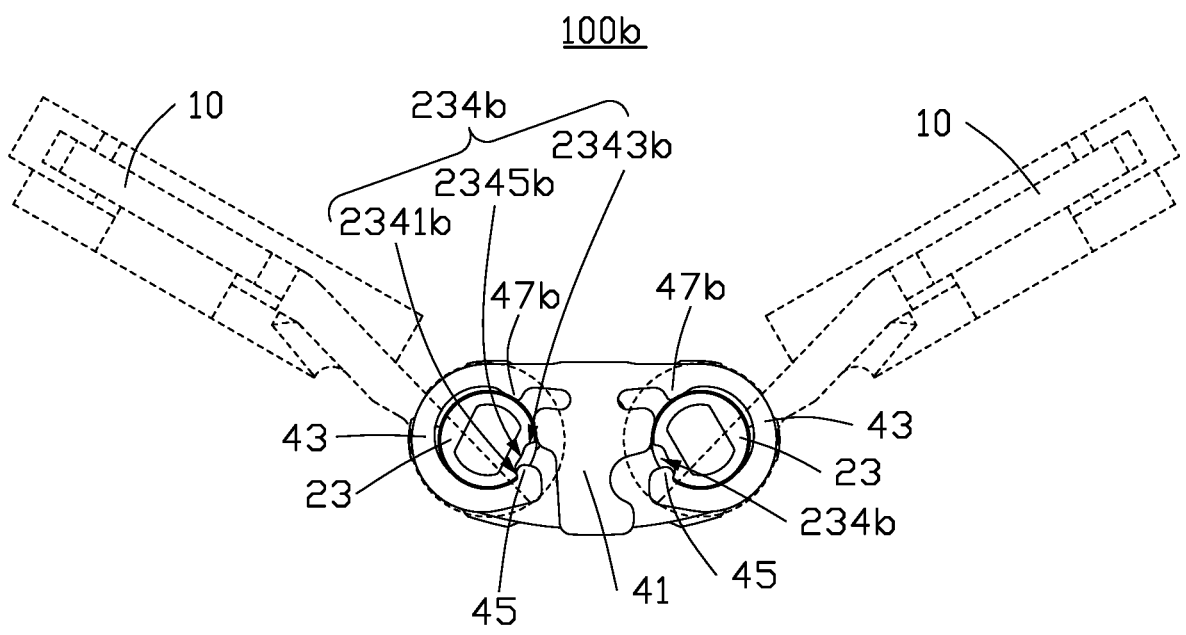
FIG. 17 is similar to FIG. 16, but shows the hinge structure in a hovering state.
Figure 18:
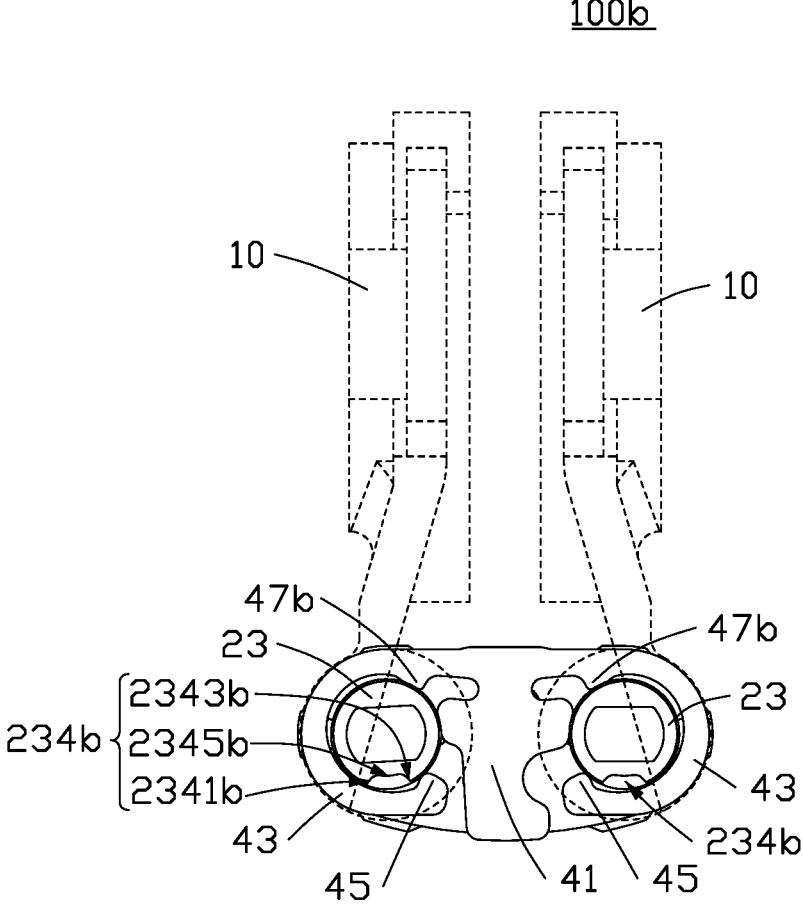
FIG. 18 is similar to FIG. 17, but shows the hinge structure in a close state.

Referring to FIGS. 16, 17, and 18, another hinge structure 100*b* is provided according to another embodiment of the present disclosure. A difference between the hinge structure 100*b* and the hinge structure 100 is that the number of grooves 234*b* on the extending portion 23 in the embodiment is one, the groove 234*b* includes a first sidewall 2341*b*, a second sidewall 2343*b*, and a bottom wall 2345*b*, and the bottom wall 2345*b* connects the first sidewall 2341*b* and the second sidewall 2343*b*. That is, the groove 234*b* has a certain width.

When the two bodies 210 are in an open state (referring to FIG. 16) or a close state (referring to FIG. 18), each of the two protrusions 45 is in contact with the outer surface 232, the two protrusions 45 are not accommodated in the groove 234b, and the two elastic arms 43 is deformed. When the two bodies 210 are from open state to close state or are from close state to open state, the two protrusions 45 are accommodated in the groove 234b (referring to FIG. 17). The frictional resistance generated during the process of the two protrusions 45 contacting the outer surface 232 and generating relative displacement is stable, and the frictional resistance between one of the two second elastic pieces 50 and the extending portion 23 is also stable, and the torques jointly formed by the two frictional resistances is also stable (referring to the self-locking interval in FIG. 17). When the two protrusions 45 are accommodated in the groove 234b, the two protrusions 45 can be spaced apart from the bottom wall 2345b, and the torques is the frictional resistance between one of the two second elastic pieces 50 and the extending portion 23 (referring to the hovering section in FIG. 19).

Figure 19:
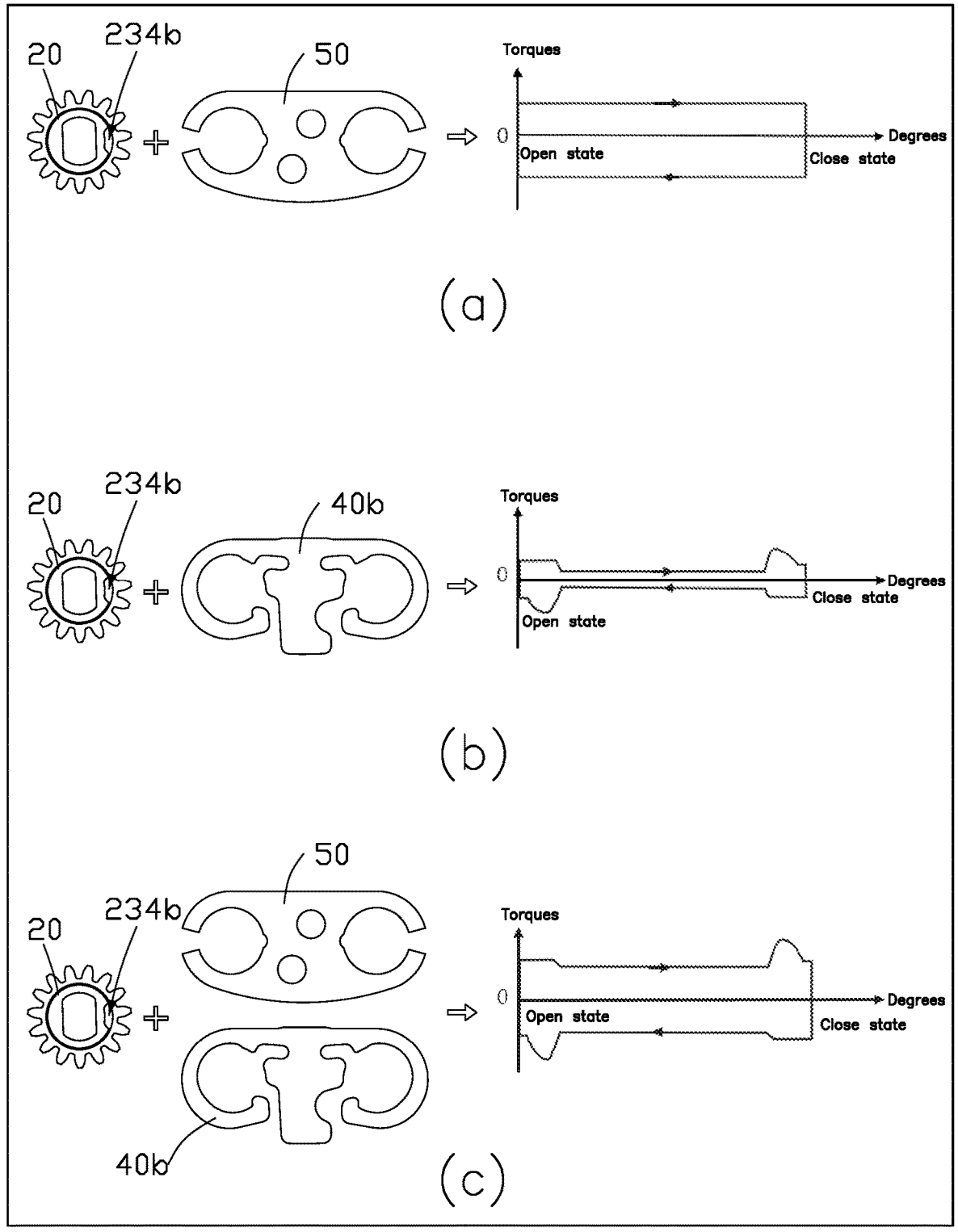
FIG. 19 includes a schematic diagram of a relationship of torques and included angles between the shaft gear in FIG. 16 and the second elastic piece in FIG. 7 are combined, a schematic diagram of a relationship of torques and included angles between the shaft gear in FIG. 16 and the first elastic piece in FIG. 15 are combined, and a schematic diagram of a relationship of torques and included angles among the shaft gear in FIG. 16, the first elastic piece in FIG. 15, and the second elastic piece in FIG. 7 are combined.

Referring to FIG. 19, FIG. 19(a) is a schematic diagram of a relationship of torques and included angles between one of the two shaft gears 20 and one of the two second elastic pieces 50 are combined, FIG. 19(b) is a schematic diagram of a relationship of torques and included angles between one of the two shaft gears 20 and one of the three first elastic pieces 40b are combined, and FIG. 19(c) is a schematic diagram of a relationship of torques and included angles among one of the two shaft gears 20, one of the three first elastic pieces 40b, and one of the two second elastic pieces 50 are combined. Each of the two shaft gears 20 is combined with the two second elastic pieces 50. In the process of closing or opening of the two bodies 210, the torque is a constant value that equals to the friction between one of the two second elastic pieces 50 and the extending portion 23. Each of the two shaft gears 20 is combined with the three first elastic pieces 40b, before the two protrusions 45 enter the at least one groove 234b, the two elastic arms 43 are deformed, a frictional resistance is generated between each of the two elastic arms 43 and the extending portion 23. After the two protrusions 45 enter the at least one groove 234b, the deformation of the two elastic arms 43 are reduced, and the two protrusions 45 are not in contact with the bottom wall 2345b of the groove 234b, which further reduces frictional resistance. Therefore, the torques of the two protrusions 45 relatively decreases when accommodated in the groove 234b, and when the two protrusions 45 moves out of the groove 234b, each of the two protrusions 45 is resisted by the second sidewall 2343b of the groove 234b, so that the torques is increased. The torque after the combination of the two shaft gears 20, the three first elastic pieces 40b, and the two second elastic pieces 50 is the sum of the combination of the two shaft gears 20 and the two second elastic pieces 50 and the combination of the two shaft gears 20 and the three first elastic pieces 40b.

Figure 20:
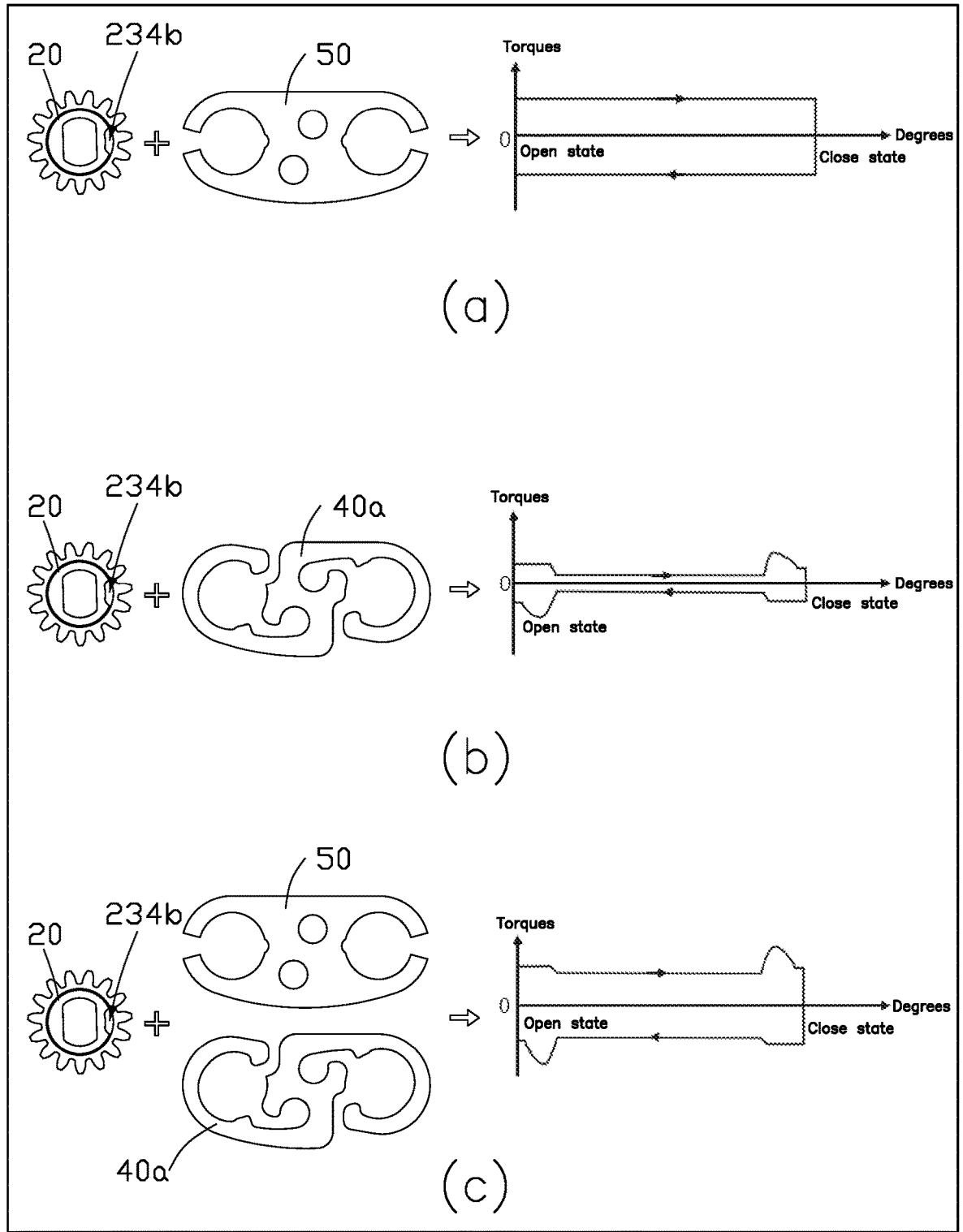
FIG. 20 includes a schematic diagram of a relationship of torques and included angles between the shaft gear in FIG. 16 and the second elastic piece in FIG. 7 are combined, a schematic diagram of a relationship of torques and included angles between the shaft gear in FIG. 16 and the first elastic piece in FIG. 12 are combined, and a schematic diagram of a relationship of torques and included angles among the shaft gear in FIG. 16, the first elastic piece in FIG. 12, and the second elastic piece in FIG. 7 are combined.

Referring to FIG. 20, FIG. 20(a) is a schematic diagram of a relationship of torques and included angles between one of the two shaft gears 20 and one of the two second elastic pieces 50 are combined, FIG. 20(b) is a schematic diagram of a relationship of torques and included angles between one of the two shaft gears 20 and one of the three first elastic pieces 40a are combined, and FIG. 20(c) is a schematic diagram of a relationship of torques and included angles among one of the two shaft gears 20, one of the three first elastic pieces 40a, and one of the two second elastic pieces 50 are combined. A difference from FIG. 19 is that the first elastic piece 40b is replaced by the second elastic piece 40a, and a relationship of torques and included angles is substantially the same. Each of the two shaft gears 20 is combined with the three first elastic pieces 40b, before the two protrusions 45 enter the at least one groove 234b, the two elastic arms 43 are deformed, a frictional resistance is generated between each of the two elastic arms 43 and the extending portion 23. After the two protrusions 45 enter the at least one groove 234b, the deformation of the two elastic arms 43 are reduced, and the two protrusions 45 are not in contact with the bottom wall 2345b of the groove 234b, which further reduces frictional resistance. Therefore, the torques of the two protrusions 45 relatively decreases when accommodated in the groove 234b, and when the two protrusions 45 moves out of the groove 234b, each of the two protrusions 45 is resisted by the second sidewall 2343b of the groove 234b, so that the torques is increased. The torque after the combination of the two shaft gears 20, the three first elastic pieces 40b, and the two second elastic pieces 50 is the sum of the combination of the two shaft gears 20 and the two second elastic pieces 50 and the combination of the two shaft gears 20 and the three first elastic pieces 40b.

Figure 21:
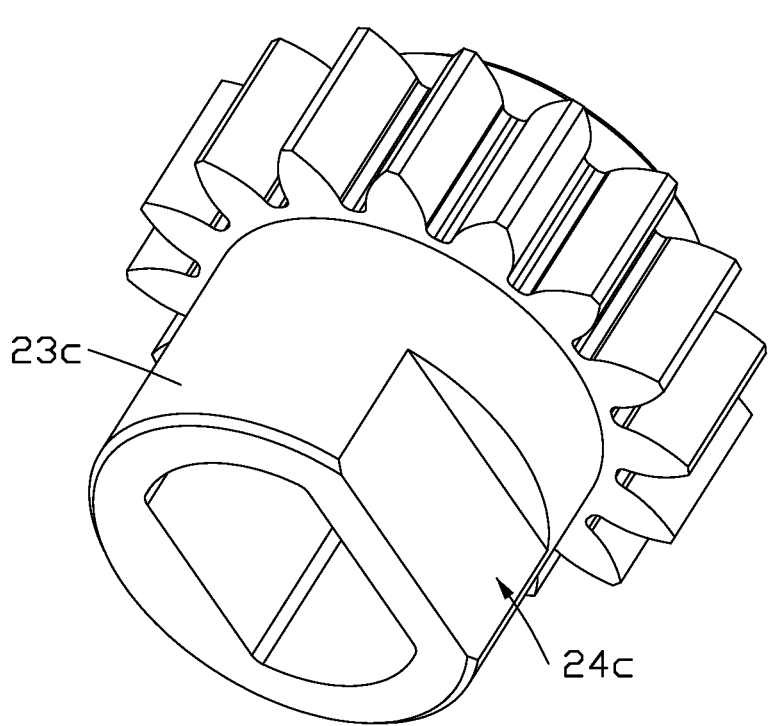
FIG. 21 is a diagrammatic view of yet another embodiment of a shaft gear according to the present disclosure.

Referring to FIG. 21, another shaft gear 20c is provided according to another embodiment of the present disclosure. A difference between the shaft gear 20c and the shaft gear 20 shown in FIG. 16 is that the groove 234b is replaced by a platform area 24c, that is, a missing portion of the cylindrical extending portion 23c forms the platform area 24c.

Figure 22:
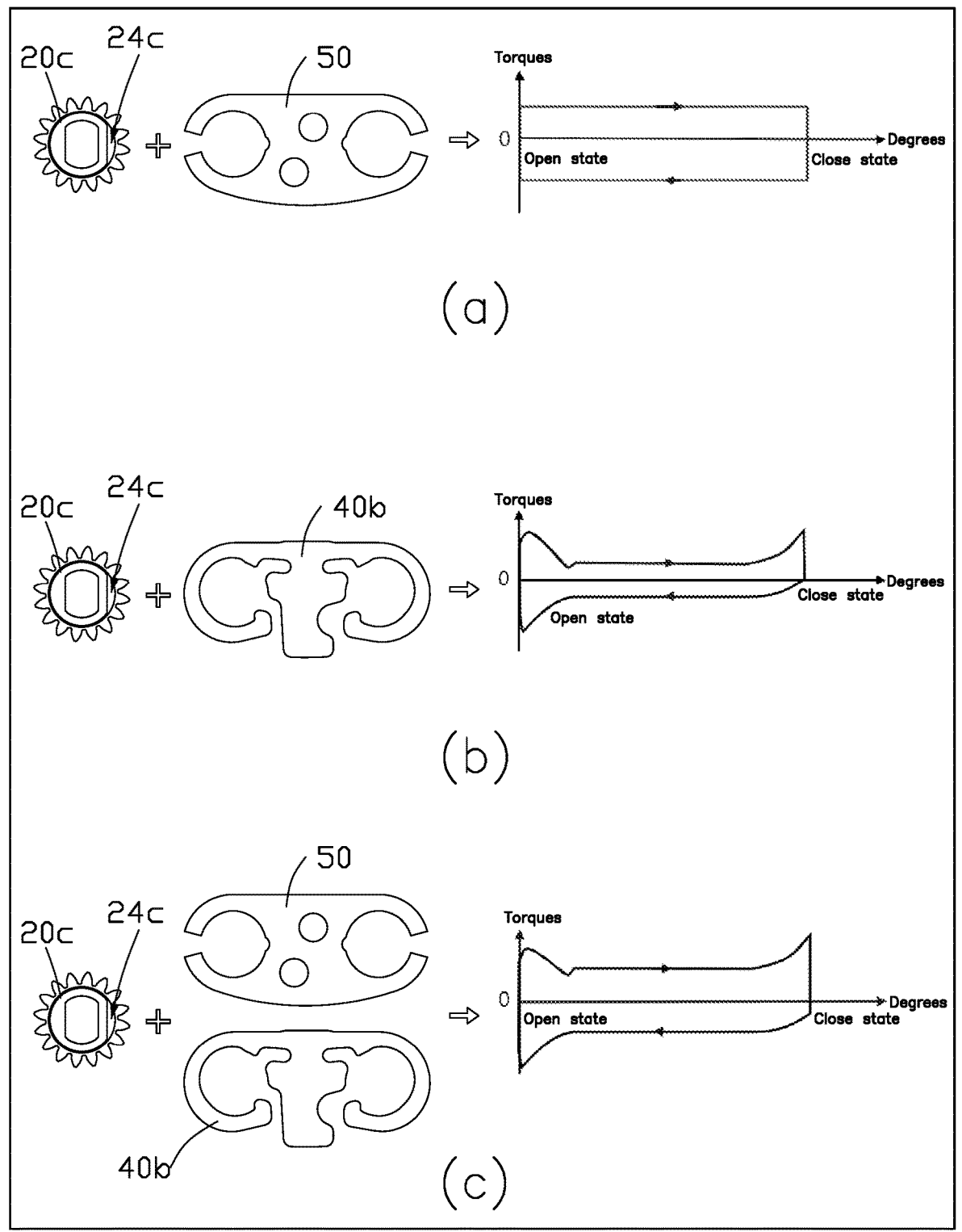
FIG. 22 is a includes a schematic diagram of a relationship of torques and included angles between the shaft gear in FIG. 21 and the second elastic piece in FIG. 7 are combined, a schematic diagram of a relationship of torques and included angles between the shaft gear in FIG. 21 and the first elastic piece in FIG. 15 are combined, and a schematic diagram of a relationship of torques and included angles among the shaft gear in FIG. 21, the first elastic piece in FIG. 15, and the second elastic piece in FIG. 7 are combined.

Referring to FIG. 22, FIG. 22(a) is a schematic diagram of a relationship of torques and included angles between one of the two shaft gears 20c and one of the two second elastic pieces 50 are combined, FIG. 22(b) is a schematic diagram of a relationship of torques and included angles between one of the two shaft gears 20c and one of the three first elastic pieces 40b are combined, and FIG. 22(c) is a schematic diagram of a relationship of torques and included angles among one of the two shaft gears 20c, one of the three first elastic pieces 40b, and one of the two second elastic pieces 50 are combined. When the two bodies 210 are closed to or opened to each other, the torques is a constant value, that is, the torques between the second elastic piece 50 and the extending portion 23c. Each of the two shaft gears 20c is combined with the three first elastic pieces 40b, before the two protrusions 45 enter the platform area 24c, the two elastic arms 43 are deformed, a frictional resistance is generated between each of the two elastic arms 43 and the extending portion 23. After the two protrusions 45 enter the platform area 24c, the deformation of the two elastic arms 43 are reduced, the two protrusions 45 and the platform area 24c gradually change from contact to non-contact and then contact again. Therefore, when the two protrusions are in the platform area 24c, the torques relatively decreases until it is constant and then increases gradually, and when the two protrusions 45 moves out of the platform area 24c, each of the two protrusions 45 is resisted by the second sidewall 2343b of the platform area 24c, so that the torques is increased. The torque after the combination of the two shaft gears 20c, the three first elastic pieces 40b, and the two second elastic pieces 50 is the sum of the combination of the two shaft gears 20c and the two second elastic pieces 50 and the combination of the two shaft gears 20c and the three first elastic pieces 40b.

Figure 23:
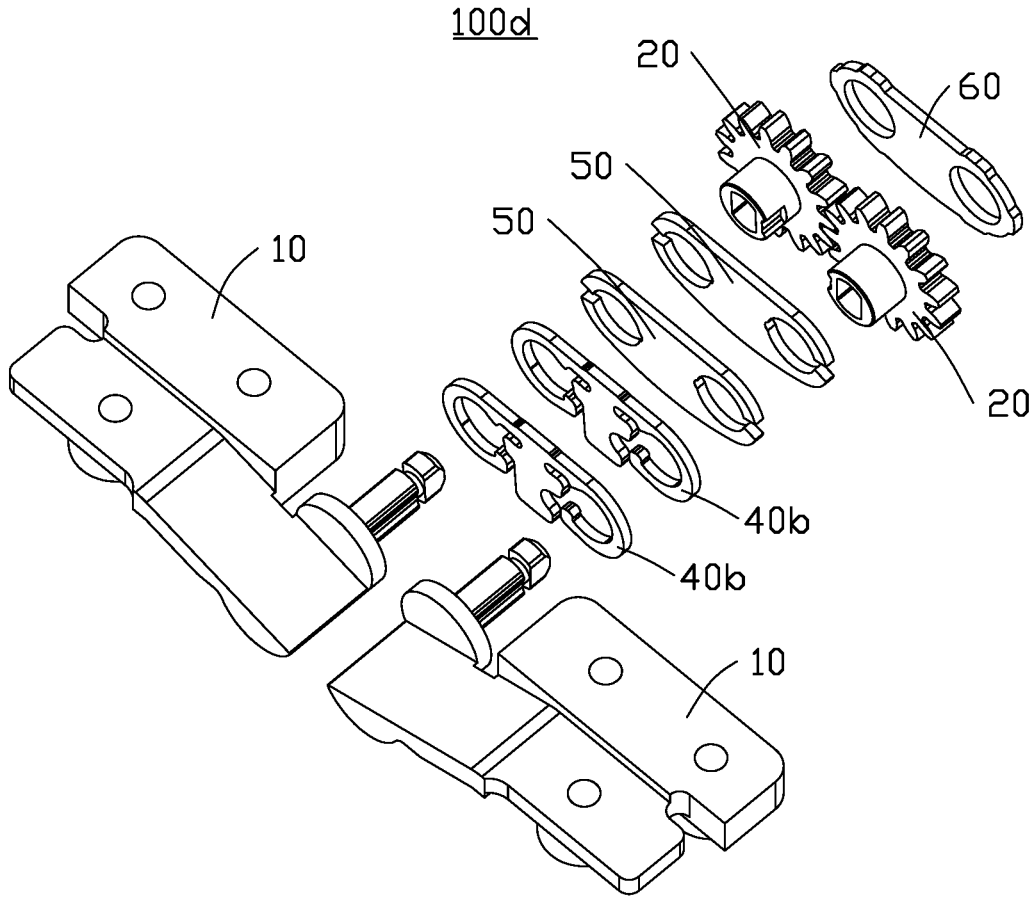
FIG. 23 is a diagrammatic view of yet another embodiment of a hinge structure according to the present disclosure.
Figure 24:
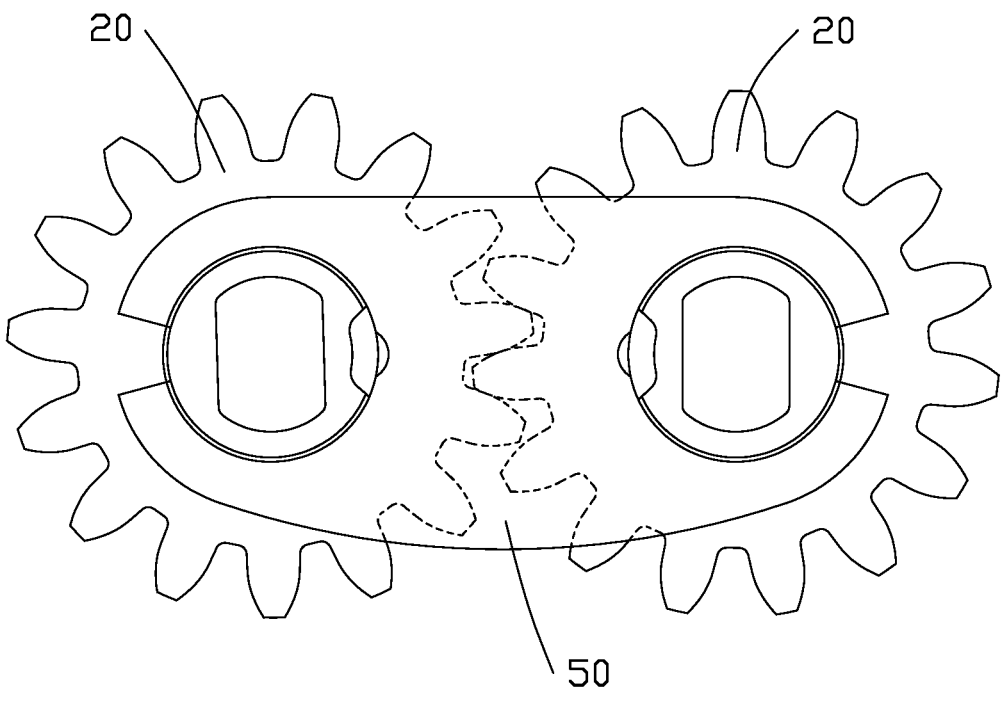
FIG. 24 is a diagrammatic view of two shaft gears in FIG. 23 engaged with each other.

Referring to FIGS. 23 and 24, a hinge structure 100d is provided according to another embodiment of the present disclosure. Differences between the hinge structure 100d and the hinge structure 100 are that the two connecting gears 30 is omitted from the hinge structure 100d, and the two shaft gears 20 are engaged with each other, so that the two shaft gears 20 can rotate in opposite directions. The two second openings 435 on the three first elastic pieces 40 allowing the two connecting gears 30 to pass through can be omitted, and the two fourth openings 535 on each of the two second elastic pieces 50 allowing the two connecting gears 30 to pass through can be omitted. In some other embodiments, the number of the connecting gears 30 is not limited to two, it only needs to be an even number, and it only needs to be able to realize that the shaft gears 20 can rotate in opposite directions.

When the hinge structure 100 includes a plurality of first elastic pieces 40, the structures of the plurality of first elastic pieces 40 may be the same. When the hinge structure 100 includes a plurality of second elastic pieces 50, the structures of the plurality of second elastic pieces 50 may be the same. When the same self-locking function and the hovering function are satisfied, the plurality of first elastic pieces 40 and/or the plurality of second elastic pieces 50 can reduce the processing cost. Moreover, the processing precision of the relatively thin first elastic pieces 40 or the plurality of second elastic pieces 50 is high. In addition, the number of the first elastic pieces 40 and/or the plurality of second elastic pieces 50 can be increased or decreased according to actual needs.

In some embodiments, when at least one of the plurality of first elastic pieces 40 and the plurality of second elastic pieces 50 is multiple, the plurality of first elastic pieces 40 or the plurality of second elastic pieces 50 can be disposed in sequence. A length of each of the at least one groove 234 along the extending direction ensures that the two protrusions 45 of the plurality of first elastic pieces 40 can be accommodated in the at least one groove 234. That is, along the extending direction of the extending portion 23, the length of the at least one groove 234 is equal to the total thickness of the plurality of first elastic pieces 40.

In some embodiments, when at least one of the first elastic pieces 40 and the plurality of second elastic pieces 50 is multiple, the plurality of first elastic pieces 40 or the plurality of second elastic pieces 50 may be alternately disposed. For example, one first elastic piece 40, one second elastic piece 50, one first elastic piece 40, and one second elastic piece 50 are disposed in that order. In some embodiments, the plurality of second elastic pieces 50 may be disposed at both ends, and the plurality of first elastic pieces 40 are disposed in the middle. The length of each of the at least one groove 234 along the extending direction ensures that the two protrusions 45 of the first elastic piece 40 close to the first gear portion 21 can be accommodated in the at least one groove 234. That is, along the extending direction of the extending portion 23, the length of each of the at least one groove 234 is greater than or equal to the total thickness of the plurality of first elastic pieces 40 and the plurality of second elastic pieces 50.

The number of the first elastic pieces 40a, 40b and the arrangement with the number of second elastic pieces 50 can be the same as the first elastic pieces 40. That is, there may be one or more first elastic pieces 40a, 40b, which may be arranged continuously, or arranged alternately with the plurality of second elastic pieces 50.

With the above configuration, both the hovering function and the self-locking function of the hinge structure 100, 100b, or 100d can be realized by covering the two shaft gears 20 with the at least one first elastic piece 40, 40a, or 40b and the at least one second elastic piece 50. In addition, the at least one first elastic pieces 40, 40a, or 40b and the at least one second elastic pieces 50 are designed to be small in size and occupy a small space. When assembling the hinge structure 100, 100b, or 100d, the at least one first elastic pieces 40, 40a, or 40b and the at least one second elastic pieces 50 are sleeved on the two shaft gears 20. The number of required components is less, and the cost is low, thereby reducing the weight and thickness of the hinge structure 100, 100b, or 100d.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A hinge structure comprising:
two hinge arms, each of the two hinge arms comprising a central shaft;
two shaft gears, each of the two shaft gears connected to the central shaft, each of the two shaft gears comprising an extending portion, at least one groove defined on the extending portion;
at least one first elastic piece, each of the at least one first elastic piece comprising two elastic arms, a first connecting portion, and two protrusions, the two elastic arms disposed on opposite sides of the first connecting portion, the two elastic arms and the first connecting portion cooperatively forming a first opening, the extending portion passing through the first opening and connected to the first connecting portion, each of the two protrusions disposed on a surface of each of the two elastic arms facing the extending portion; and
at least one second elastic piece sleeved on the extending portion;
wherein the two protrusions are configured to be accommodated in the at least one groove.

2. The hinge structure of claim 1, wherein each of the at least one first elastic piece comprises two protruding portions, each of the two protruding portions is disposed on a surface of one of the two elastic arms facing the extending portion, and the two protruding portions are disposed between one of the two protrusions and the first connecting portion.

3. The hinge structure of claim 1, wherein one end of each of the two elastic arms is connected to the first connecting portion, and the other end of each of the two elastic arms is spaced apart from the first connecting portion to form a first notch, each of the two protrusions is disposed at the end of one of the two elastic arms adjacent to the first notch.

4. The hinge structure of claim 1, further comprising a plurality of connecting gears in even number, wherein each of the two shaft gears comprises a first gear portion, the plurality of connecting gears are disposed between two first gear portions of the two shaft gears, the plurality of connecting gears are engaged with the first gear portion; each of the plurality of connecting gears comprises a rod portion, a plurality of second openings are defined on the first connecting portion, the rod portions of the plurality of connecting gears pass through the plurality of second openings; a plurality of second notches are defined on the first connecting portion, the plurality of second notches are disposed between the plurality of first openings and the plurality of second openings, each of the plurality of second notches communicates with one of the plurality of first openings and one of the plurality of second openings.

5. The hinge structure of claim 1, wherein each of the at least one second elastic piece comprises a second connecting portion and two engaging structures, the two engaging structures are disposed on opposite sides of the second connecting portion, the two engaging structures and the second connecting portion surround form a third opening, and the extending portion passes through the third opening.

6. The hinge structure of claim 1, wherein the hinge structure comprises a plurality of first elastic pieces and a plurality of second elastic pieces, and the plurality of the first elastic pieces and the plurality of the second elastic pieces are alternately disposed.

7. The hinge structure of claim 6, wherein along an extending direction of the extending portion, a length of each of the at least one groove is greater than or equal to a total thickness of the plurality of first elastic pieces and the plurality of second elastic pieces.

8. The hinge structure of claim 1, wherein each of the two elastic arms is C-shaped, one end of each of the two elastic arms is connected to the first connecting portion, and the other end of each of the two elastic arms is spaced apart from the first connecting portion to form a first notch, two first notches are disposed at different ends of the first connecting portion.

9. The hinge structure of claim 1, wherein each of the two elastic arms is C-shaped, one end of each of the two elastic arms is connected to the first connecting portion, and the other end of each of the two elastic arms is spaced apart from the first connecting portion to form a first notch, two first notches are disposed at a same end of the first connecting portion.

10. A terminal device comprising:
   a hinge structure comprising:
      two hinge arms, each of the two hinge arms comprising a central shaft;
      two shaft gears, each of the two shaft gears connected to the central shaft, each of the two shaft gears comprising an extending portion, at least one groove defined on the extending portion;
      at least one first elastic piece, each of the at least one first elastic piece comprising two elastic arms, a first connecting portion, and two protrusions, the two elastic arms disposed on opposite sides of the first connecting portion, the two elastic arms and the first connecting portion cooperatively forming a first opening, the extending portion passing through the first opening and connected to the first connecting portion, each of the two protrusions disposed on a surface of each of the two elastic arms facing the extending portion; and
      at least one second elastic piece sleeved on the extending portion;
   wherein the two protrusions are configured to be accommodated in the at least one groove.

11. The terminal device of claim 10, wherein each of the at least one first elastic piece comprises two protruding portions, each of the two protruding portions is disposed on a surface of one of the two elastic arms facing the extending portion, and the two protruding portions are disposed between one of the two protrusions and the first connecting portion.

12. The terminal device of claim 10, wherein one end of each of the two elastic arms is connected to the first connecting portion, and the other end of each of the two elastic arms is spaced apart from the first connecting portion to form a first notch, each of the two protrusions is disposed at the end of one of the two elastic arms adjacent to the first notch.

13. The terminal device of claim 10, wherein the hinge structure further comprises a plurality of connecting gears in even number, each of the two shaft gears comprises a first gear portion, the plurality of connecting gears are disposed between two first gear portions of the two shaft gears, the plurality of connecting gears are engaged with the first gear portion; each of the plurality of connecting gears comprises a rod portion, a plurality of second openings are defined on the first connecting portion, the rod portions of the plurality of connecting gears pass through the plurality of second openings; a plurality of second notches are defined on the first connecting portion, the plurality of second notches are disposed between the plurality of first openings and the plurality of second openings, each of the plurality of second notches communicates with one of the plurality of first openings and one of the plurality of second openings.

14. The terminal device of claim 10, wherein each of the at least one second elastic piece comprises a second connecting portion and two engaging structures, the two engaging structures are disposed on opposite sides of the second connecting portion, the two engaging structures and the second connecting portion surround form a third opening, and the extending portion passes through the third opening.

15. The terminal device of claim 10, wherein the hinge structure comprises a plurality of first elastic pieces and a plurality of second elastic pieces, and the plurality of the first elastic pieces and the plurality of the second elastic pieces are alternately disposed.

16. The terminal device of claim 15, wherein along an extending direction of the extending portion, a length of each of the at least one groove is greater than or equal to a total thickness of the plurality of first elastic pieces and the plurality of second elastic pieces.

17. The terminal device of claim 10, wherein each of the two elastic arms is C-shaped, one end of each of the two elastic arms is connected to the first connecting portion, and the other end of each of the two elastic arms is spaced apart from the first connecting portion to form a first notch, two first notches are disposed at different ends of the first connecting portion.

18. The terminal device of claim 10, wherein each of the two elastic arms is C-shaped, one end of each of the two elastic arms is connected to the first connecting portion, and the other end of each of the two elastic arms is spaced apart from the first connecting portion to form a first notch, two first notches are disposed at a same end of the first connecting portion.

* * * * *